US011242210B1

(12) United States Patent
Bitondo et al.

(10) Patent No.: US 11,242,210 B1
(45) Date of Patent: Feb. 8, 2022

(54) PORTABLE BRUSHLESS CONVEYOR BELT CLEANER SYSTEM

(71) Applicants: Steven Bitondo, Stamford, CT (US); Victor A. Ceci, Stamford, CT (US); Gregory Wyatt, Stamford, CT (US); Joseph Franzino, Stamford, CT (US)

(72) Inventors: Steven Bitondo, Stamford, CT (US); Victor A. Ceci, Stamford, CT (US); Gregory Wyatt, Stamford, CT (US); Joseph Franzino, Stamford, CT (US)

( * ) Notice: Subject to any disclaimer, the term of this patent is extended or adjusted under 35 U.S.C. 154(b) by 0 days.

(21) Appl. No.: 17/408,716

(22) Filed: Aug. 23, 2021

(51) Int. Cl.
| | |
|---|---|
| *B65G 45/24* | (2006.01) |
| *B65G 45/12* | (2006.01) |
| *B65G 45/22* | (2006.01) |
| *B65G 45/26* | (2006.01) |

(52) U.S. Cl.
CPC ............ *B65G 45/24* (2013.01); *B65G 45/12* (2013.01); *B65G 45/22* (2013.01); *B65G 45/26* (2013.01)

(58) Field of Classification Search
CPC ........ B65G 45/24; B65G 45/12; B65G 45/22; B65G 45/26; B65G 45/14; B65G 45/16
See application file for complete search history.

(56) References Cited

U.S. PATENT DOCUMENTS

| | | | |
|---|---|---|---|
| 3,326,607 A | 6/1967 | Book | |
| 3,387,992 A | 6/1968 | Arthur | |
| 4,087,320 A | 5/1978 | Danahy | |
| 4,754,868 A | 6/1988 | Hughes | |
| 4,777,972 A | 10/1988 | Adam | |
| 4,915,211 A | 4/1990 | Dohmeier | |
| 5,031,750 A | 7/1991 | Barnes | |
| 5,333,724 A * | 8/1994 | Wingfield | ................ A21B 1/48 15/302 |
| 5,355,992 A * | 10/1994 | Baig | ...................... B65G 45/22 198/495 |
| 5,783,044 A | 7/1998 | Schneider | |
| 6,364,959 B1 | 4/2002 | Straub | |
| 6,601,692 B2 | 8/2003 | Schaefer | |

(Continued)

FOREIGN PATENT DOCUMENTS

| | | |
|---|---|---|
| FR | 2630413 A1 | 10/1989 |
| GB | 1389957 | 4/1975 |

(Continued)

*Primary Examiner* — Mark A Deuble
(74) *Attorney, Agent, or Firm* — Todd S. Sharinn, Esq.

(57) ABSTRACT

A conveyor belt cleaner system comprising a platen positioned transversely of the conveyor belt; a steam chamber transversely disposed over a first portion of the conveyor belt, the steam chamber including a tubular steam header; a vacuum chamber adjacent the steam chamber and disposed over a second portion of the conveyor belt, the vacuum chamber having an outlet connectable to a source of vacuum; a first wiper in wiping contact with the conveyor belt defining an entrance to the steam chamber; a second wiper having a discontinuous wiping surface defining a septum between the vacuum and steam chambers; a third wiper defining an exit from the vacuum chamber; and apparatus including a rotatable bolt cooperative with the steam header to vary the width of steam application from the steam header onto the conveyor belt in accordance with a width of conveyor belt presented to the conveyor belt cleaner system.

25 Claims, 33 Drawing Sheets

(56) References Cited

U.S. PATENT DOCUMENTS

| | | |
|---|---|---|
| 7,407,051 B1 | 8/2008 | Farris |
| 7,784,476 B2 | 8/2010 | Handy |
| 9,248,975 B2 | 2/2016 | Handy |
| 10,046,920 B1 * | 8/2018 | Green ................... B08B 3/041 |
| 10,150,623 B2 | 12/2018 | Handy |
| 10,266,348 B1 * | 4/2019 | Yoo ....................... B65G 45/12 |
| 2020/0062513 A1 * | 2/2020 | Hutchison .............. B65G 45/26 |
| 2020/0407172 A1 * | 12/2020 | Vidrio Borrego ..... B65G 45/26 |

FOREIGN PATENT DOCUMENTS

| | | |
|---|---|---|
| GB | 1420439 | 1/1976 |
| GB | 2352703 | 6/2003 |
| JP | 0711044 Y2 | 3/1995 |
| JP | 3336899 B2 | 10/2002 |
| JP | 4515741 B2 | 4/2010 |
| KR | 20100109601 | 10/2010 |

\* cited by examiner

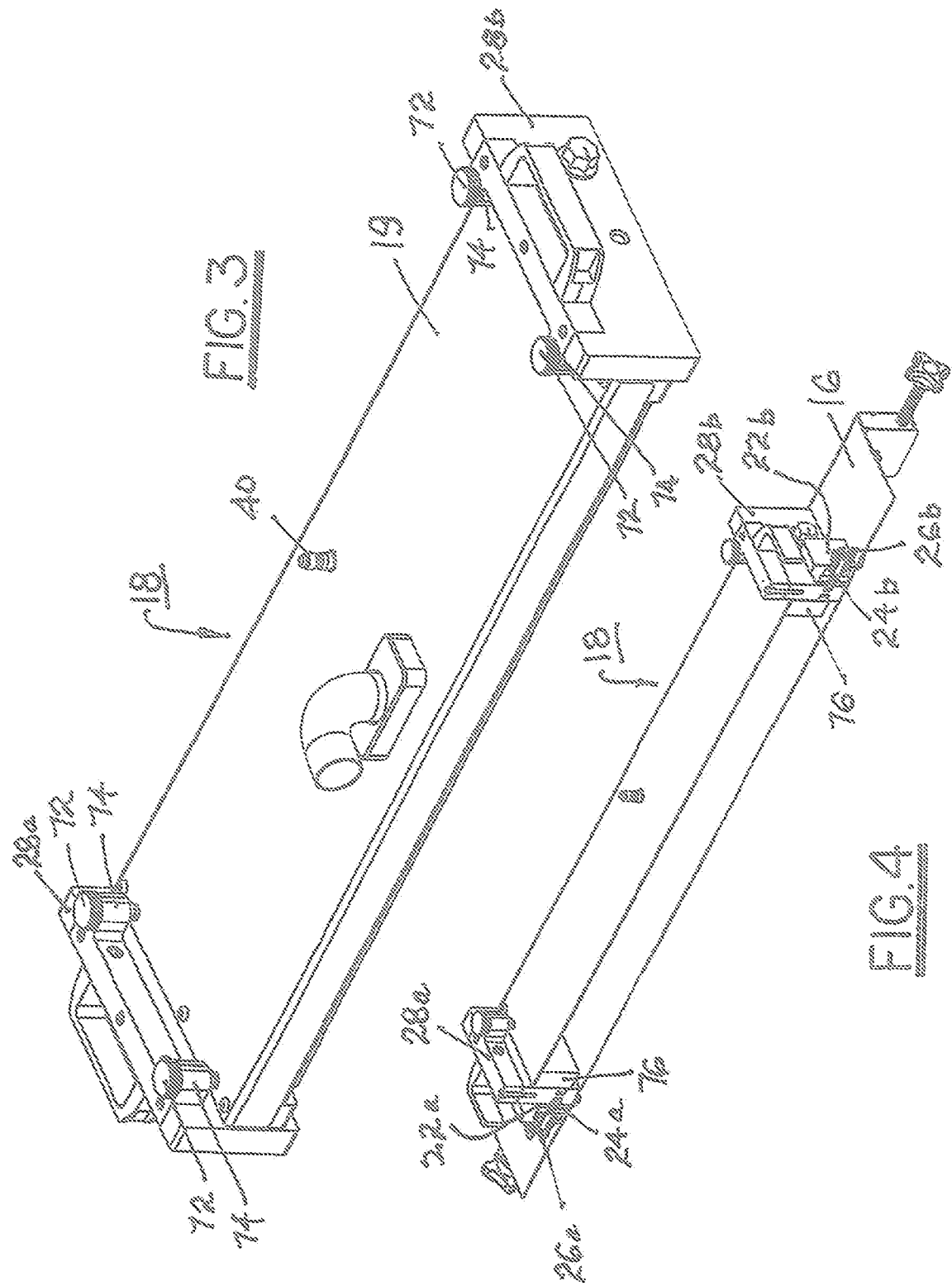

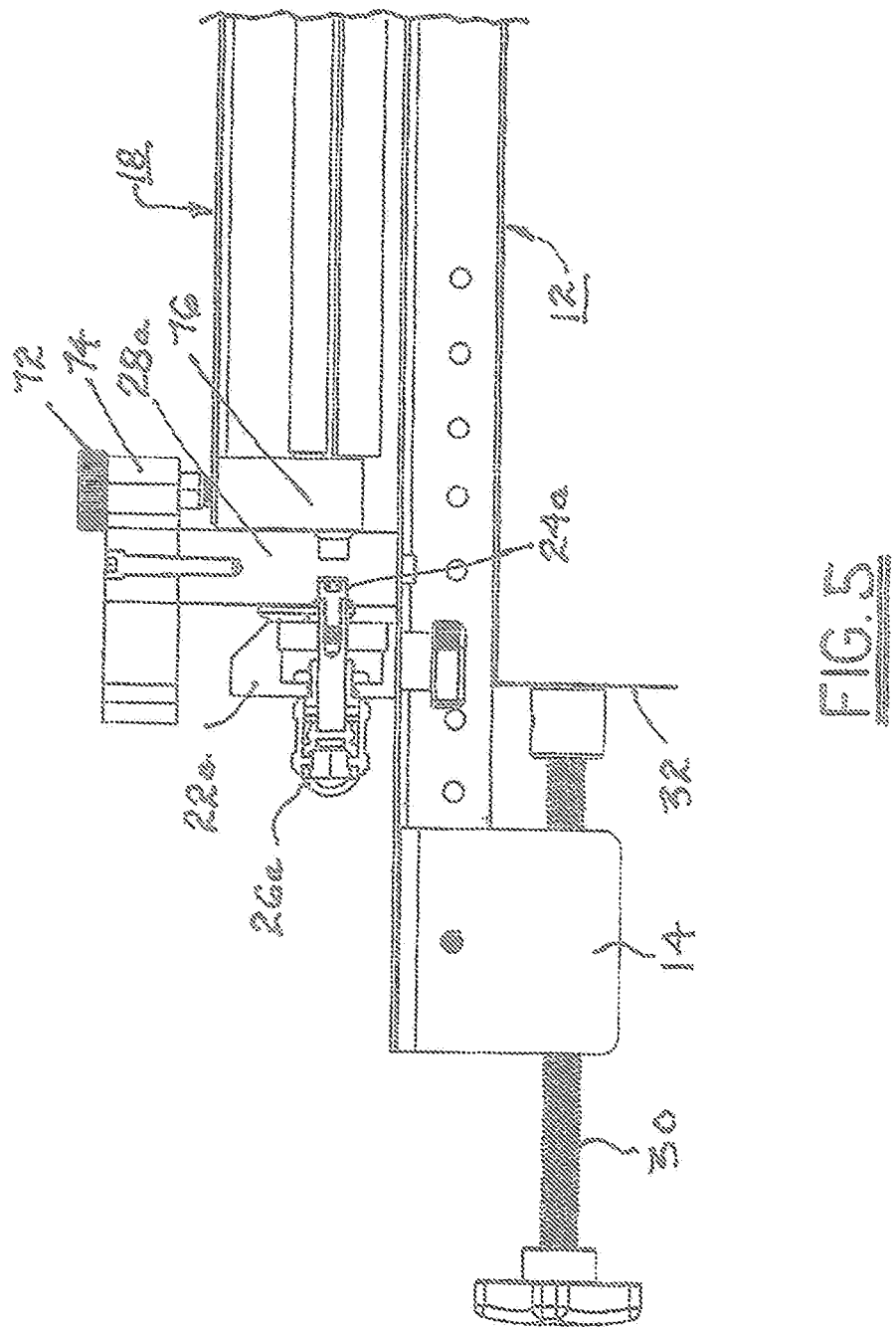

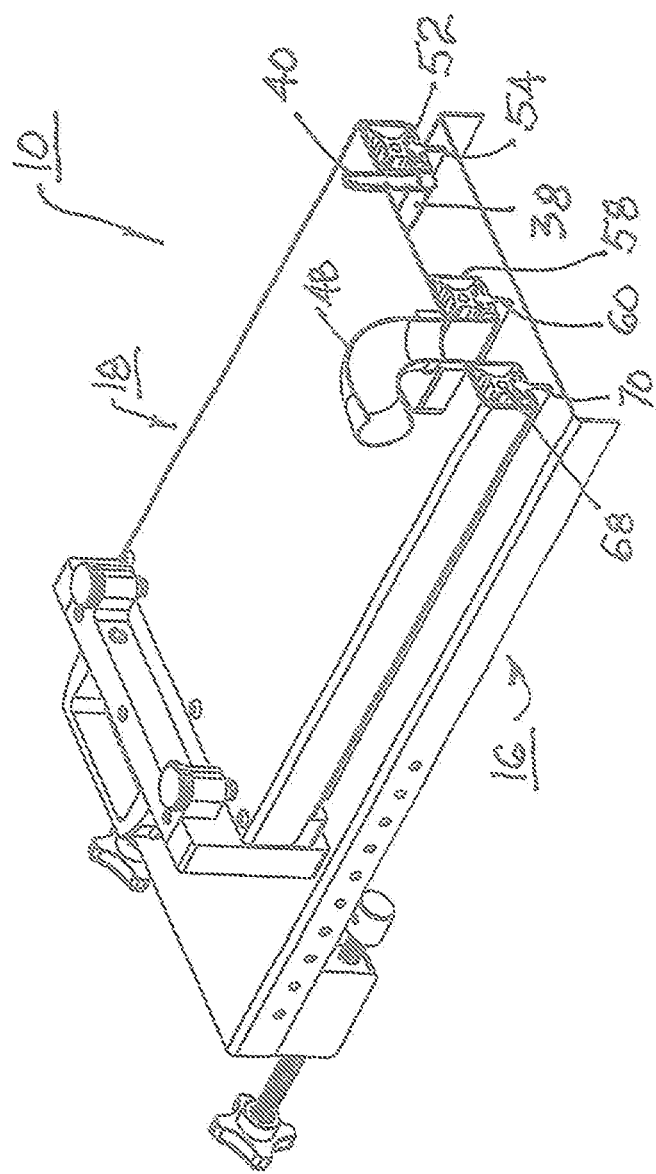

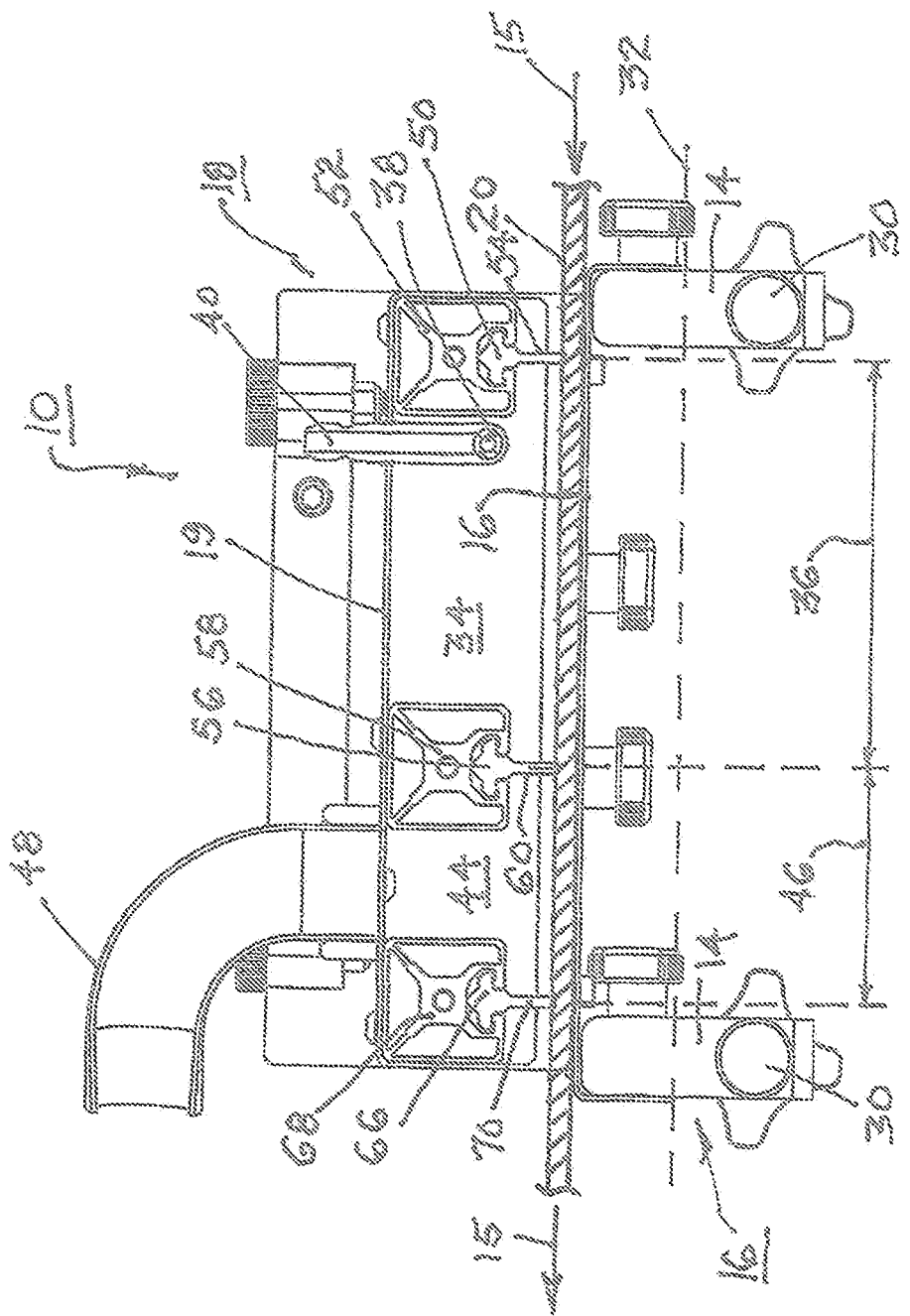

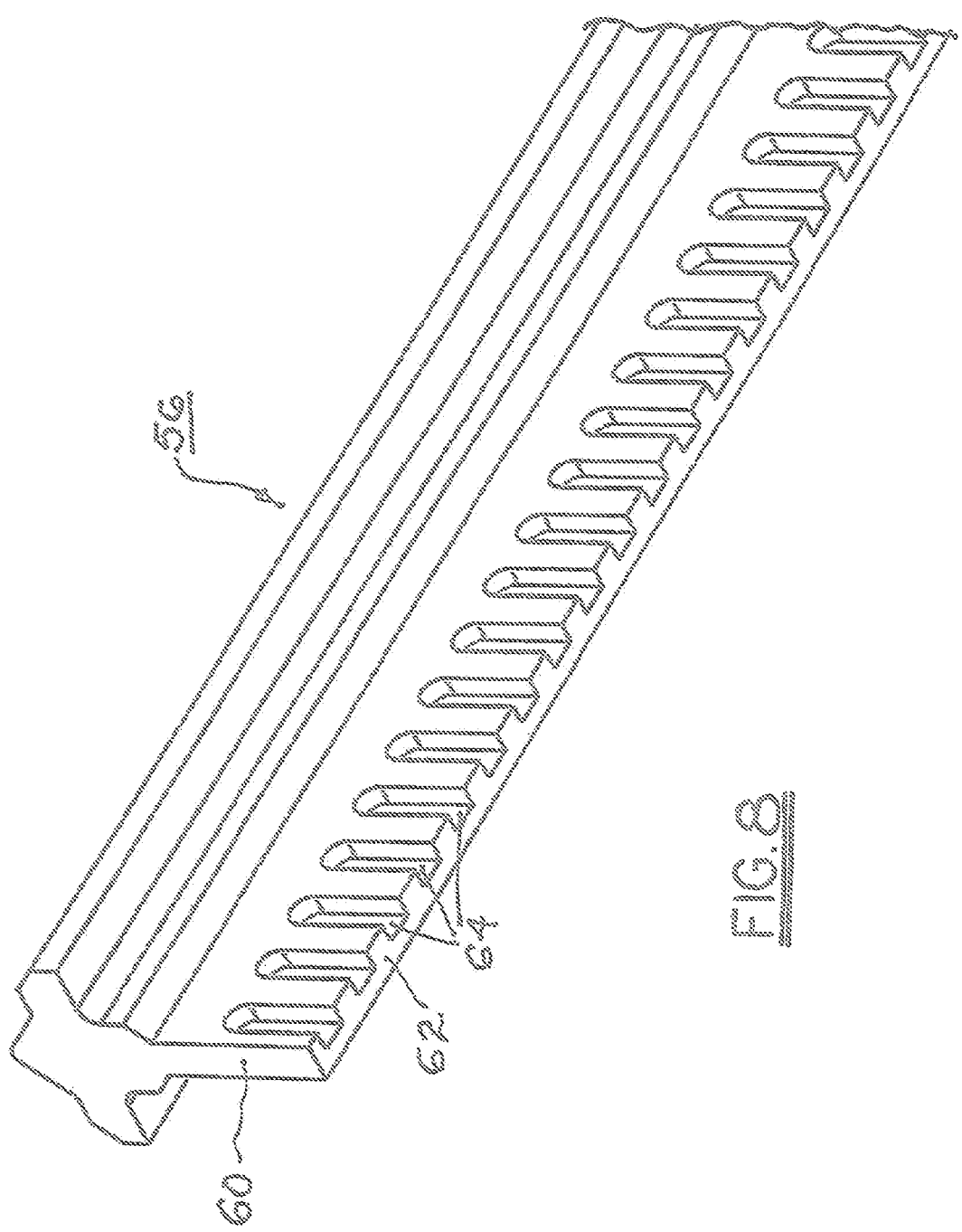

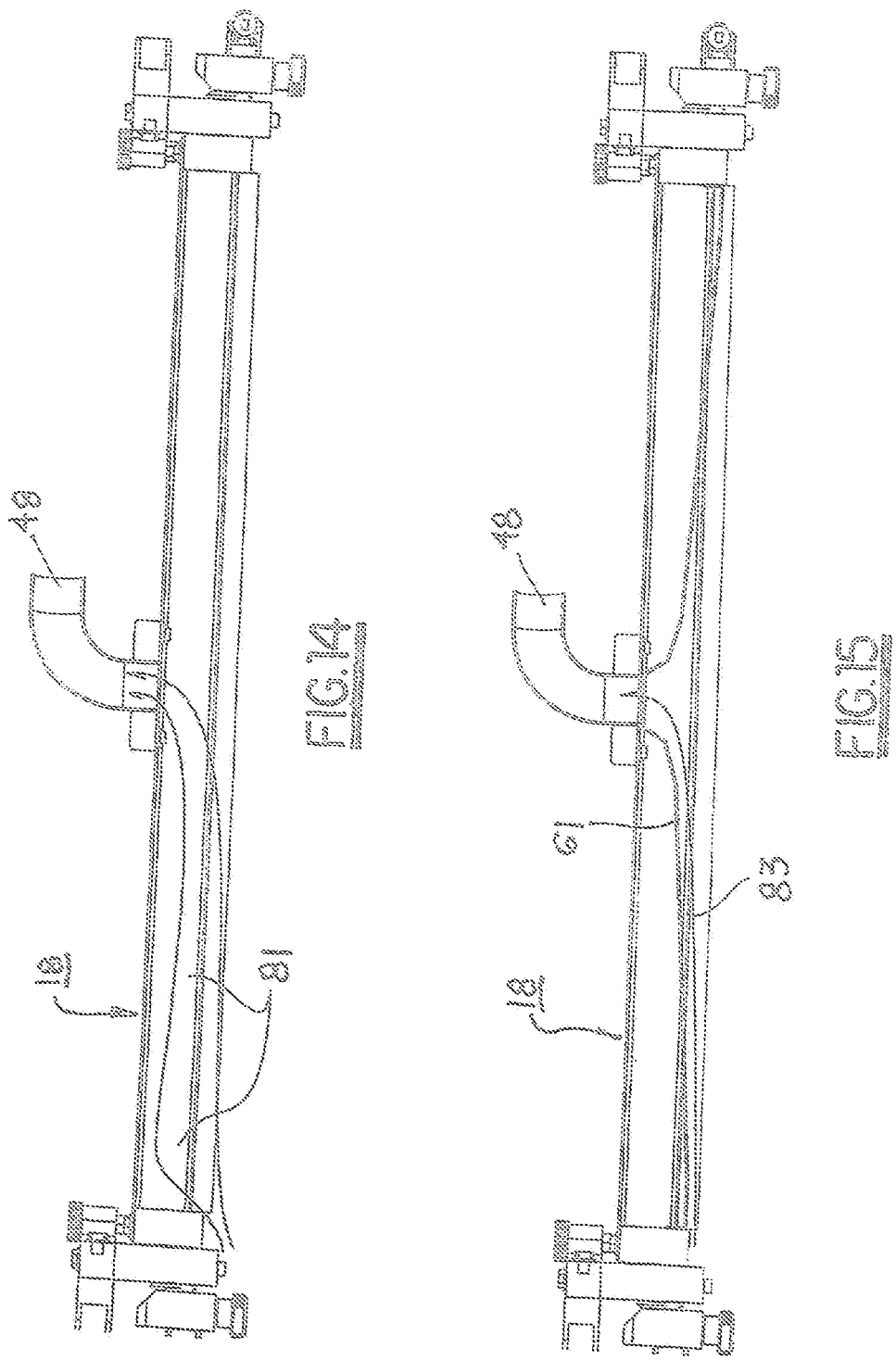

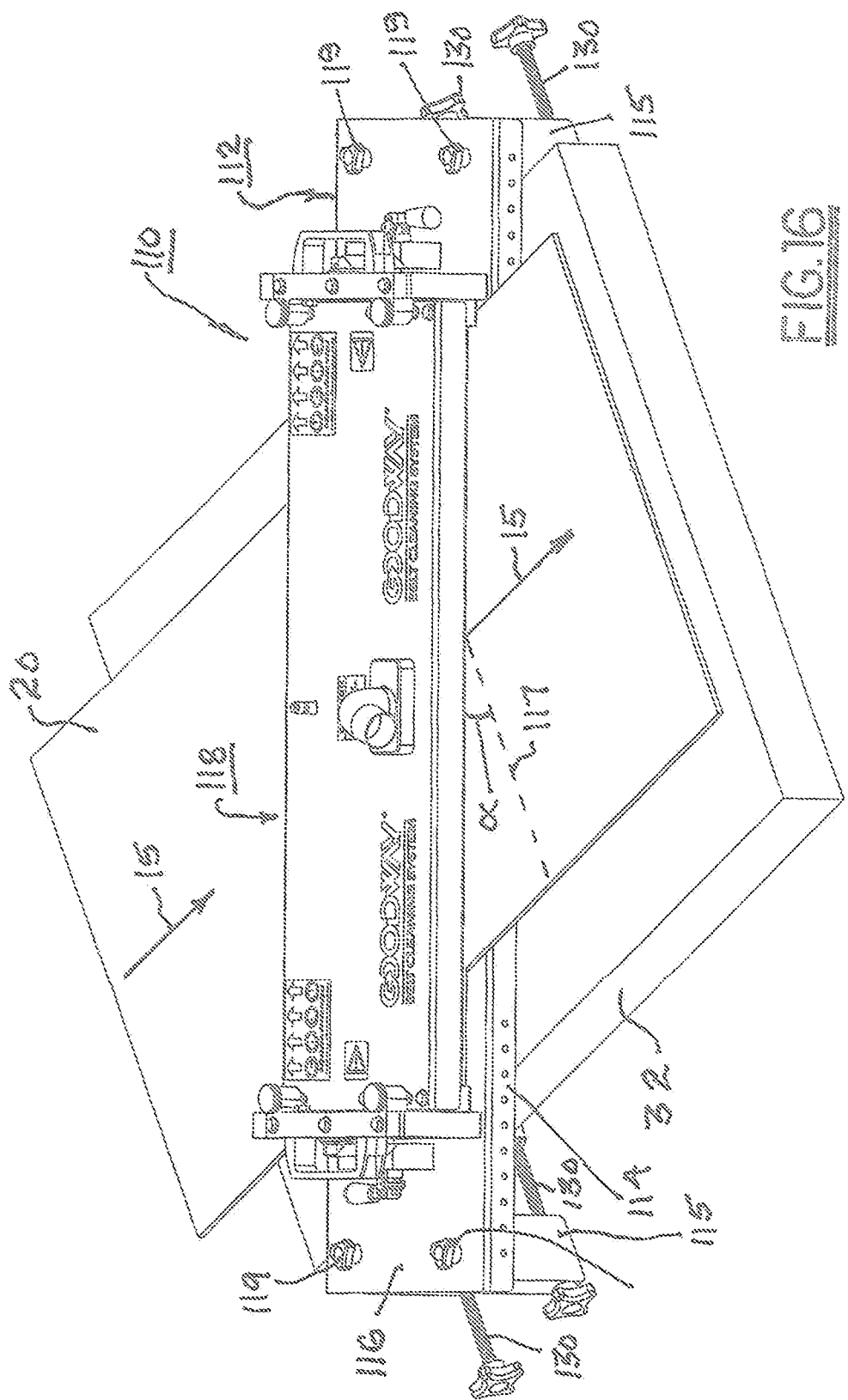

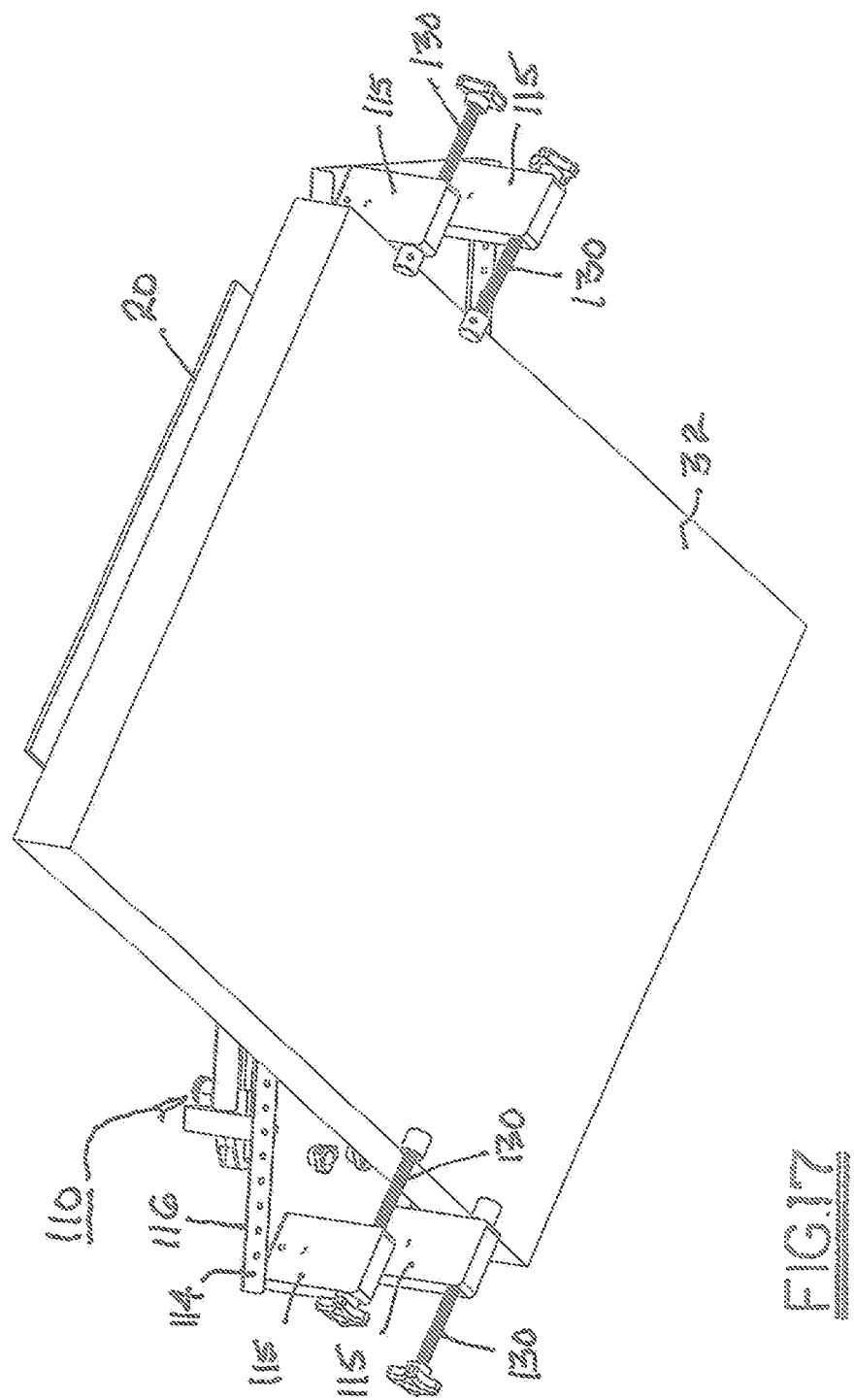

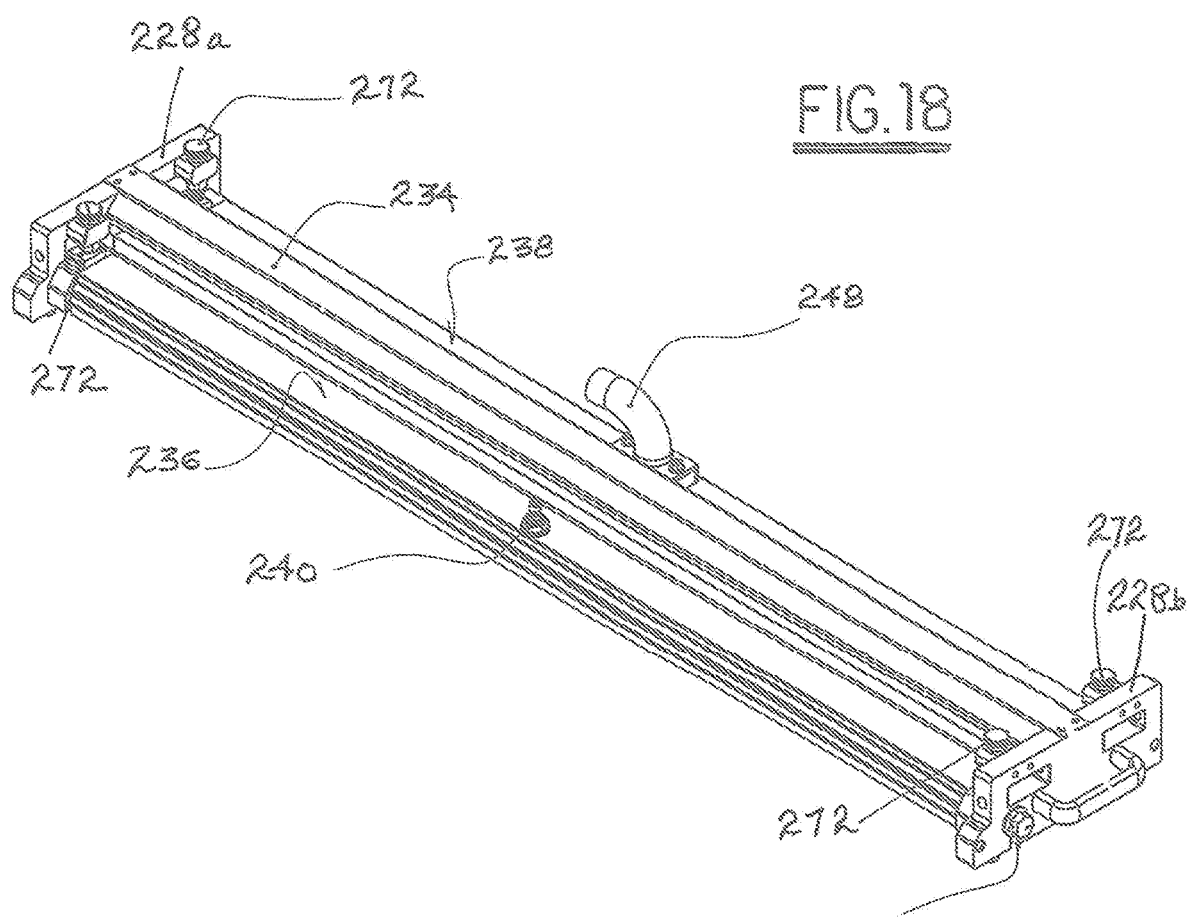

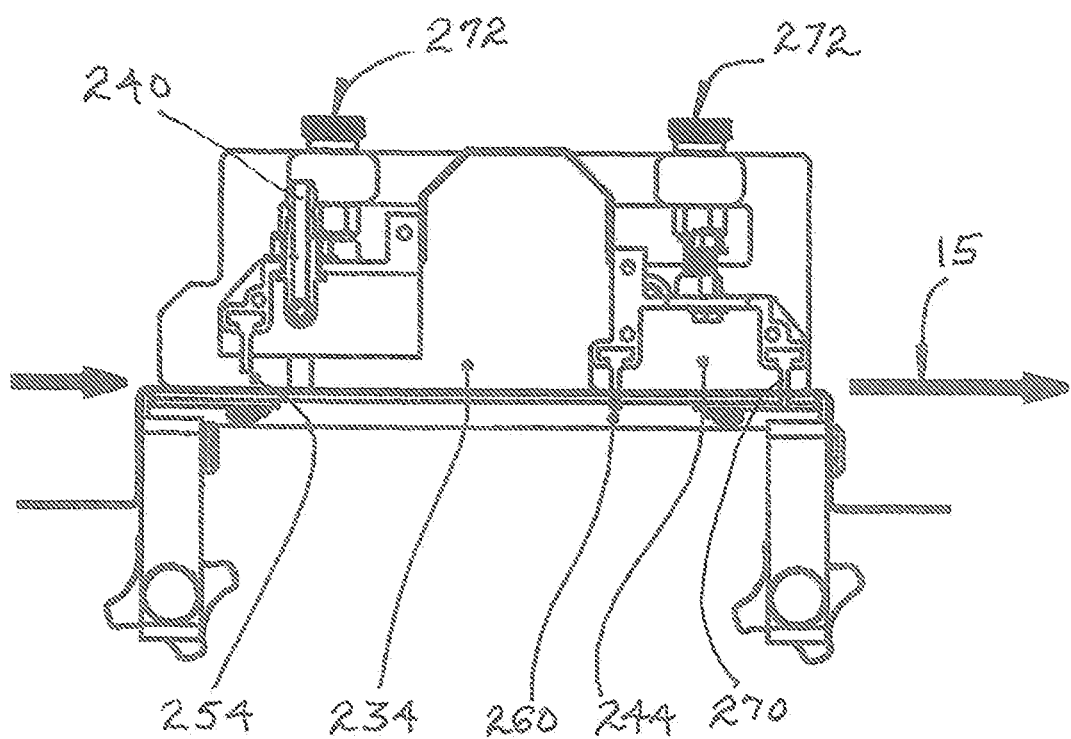

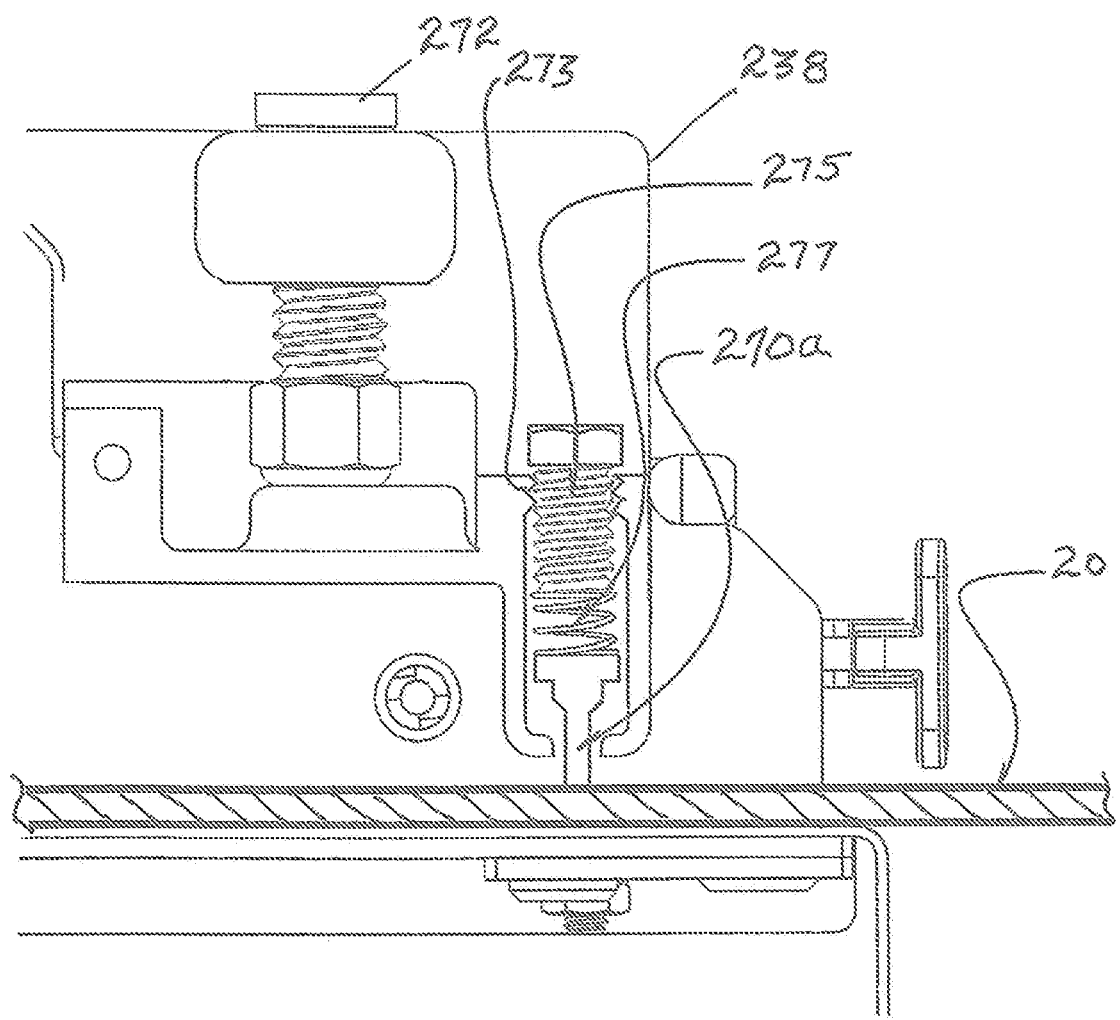

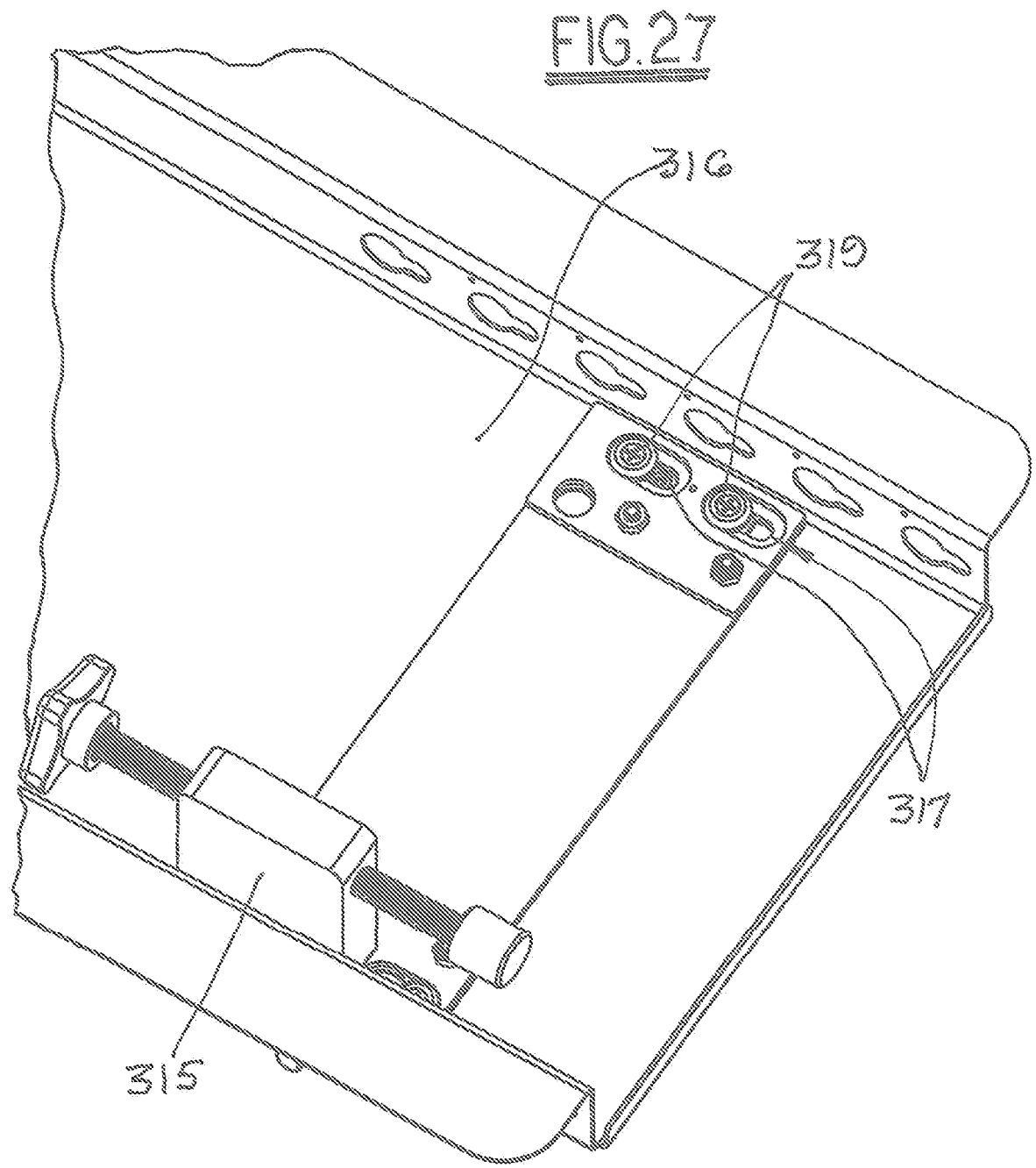

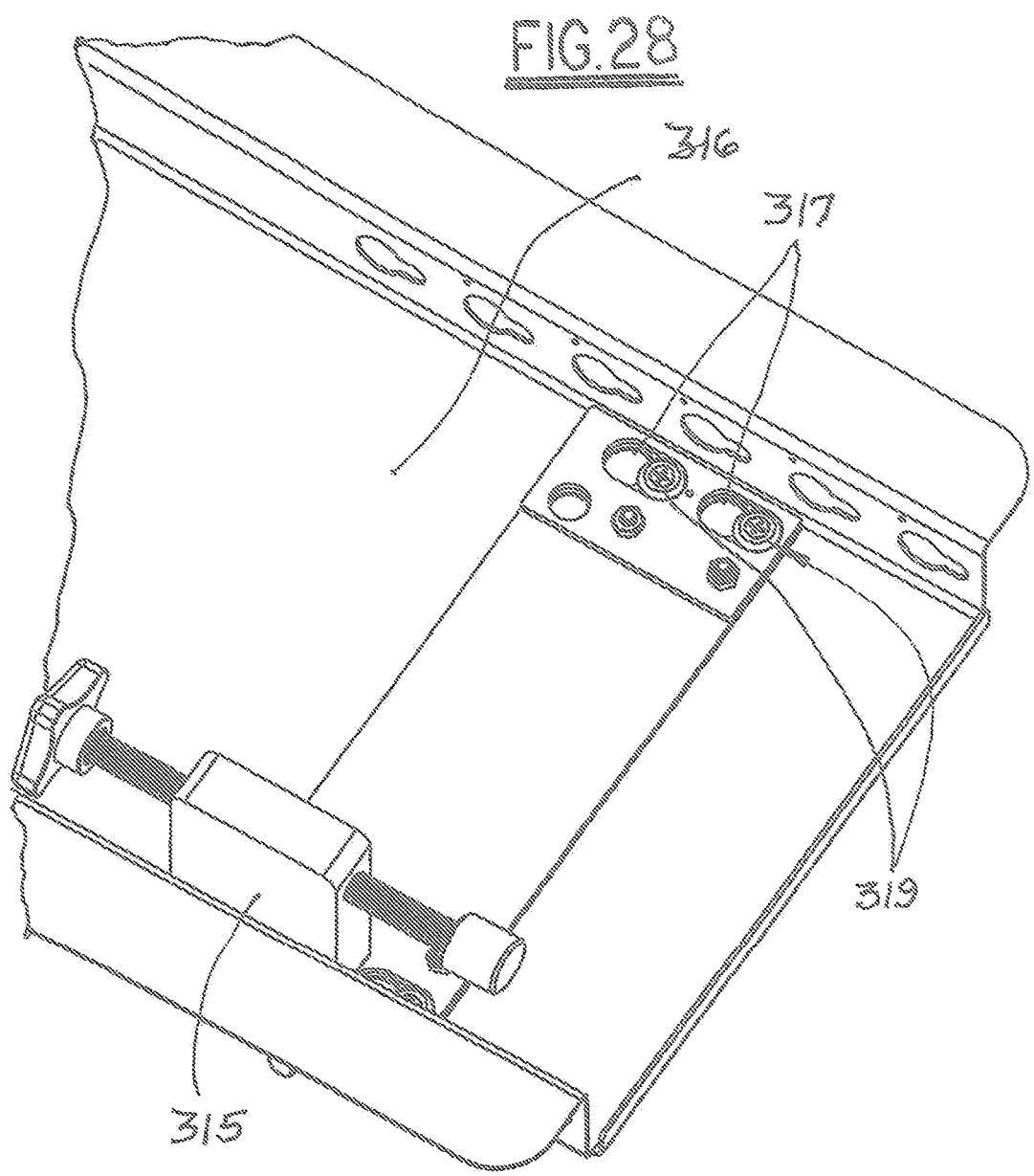

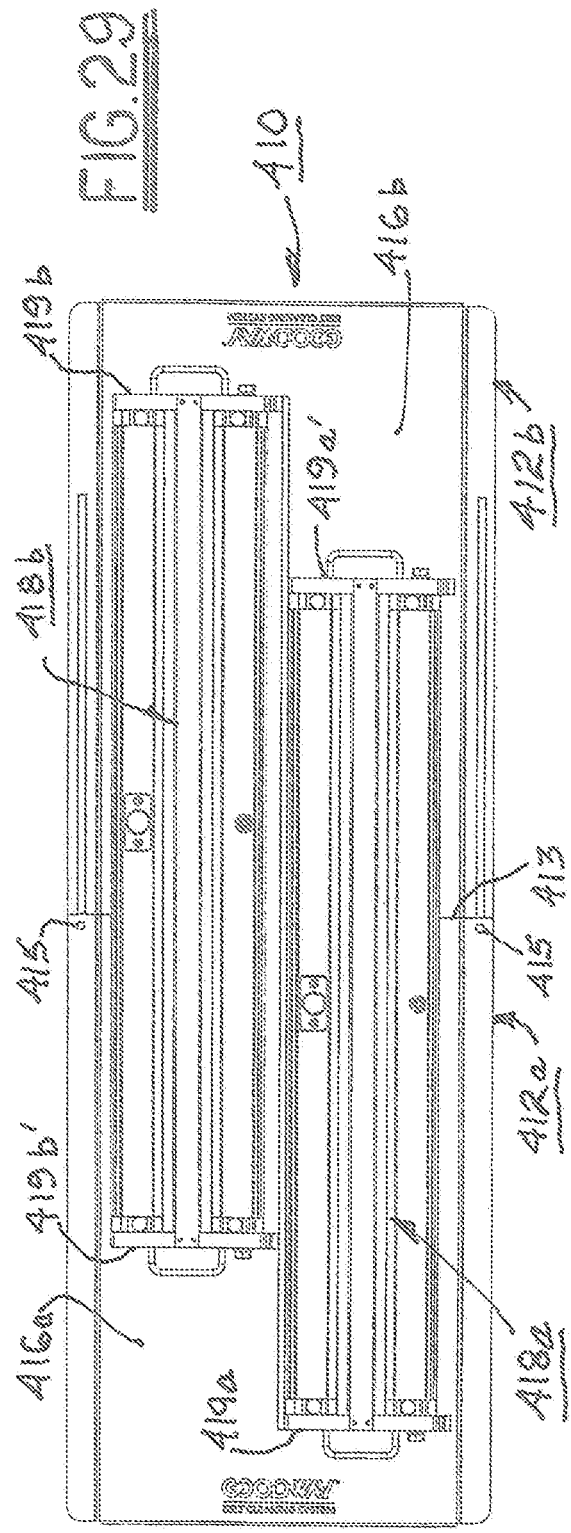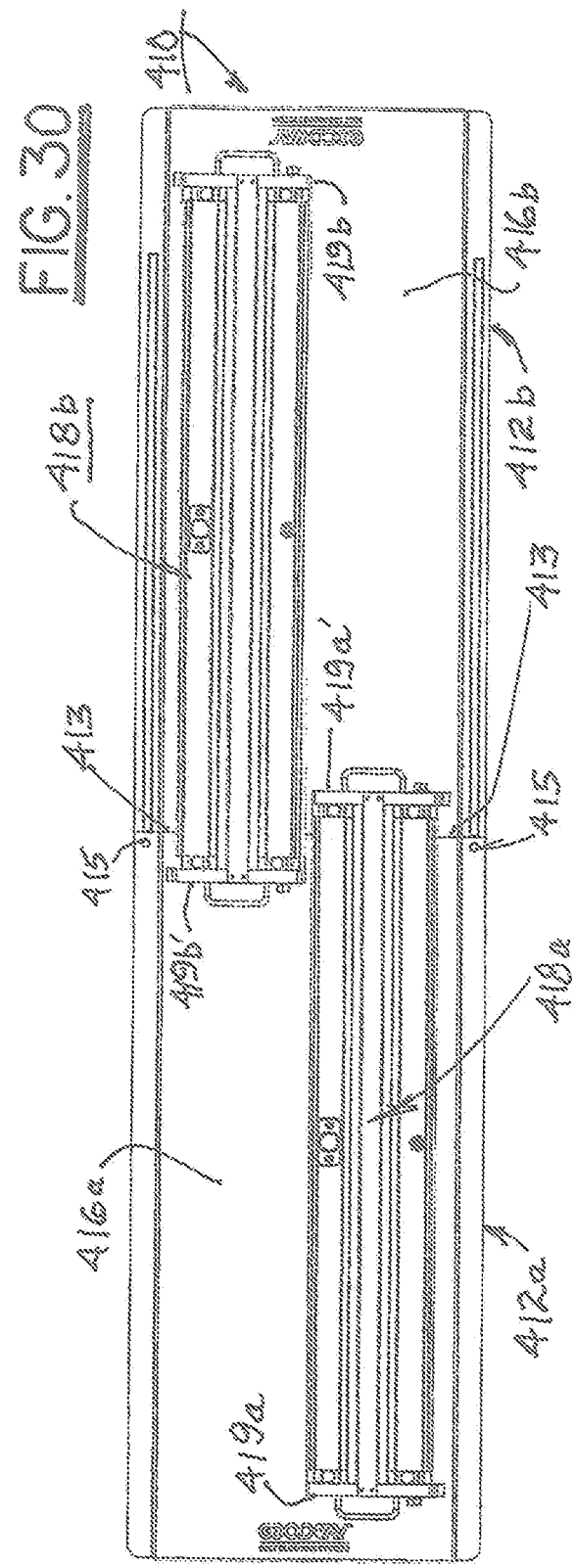

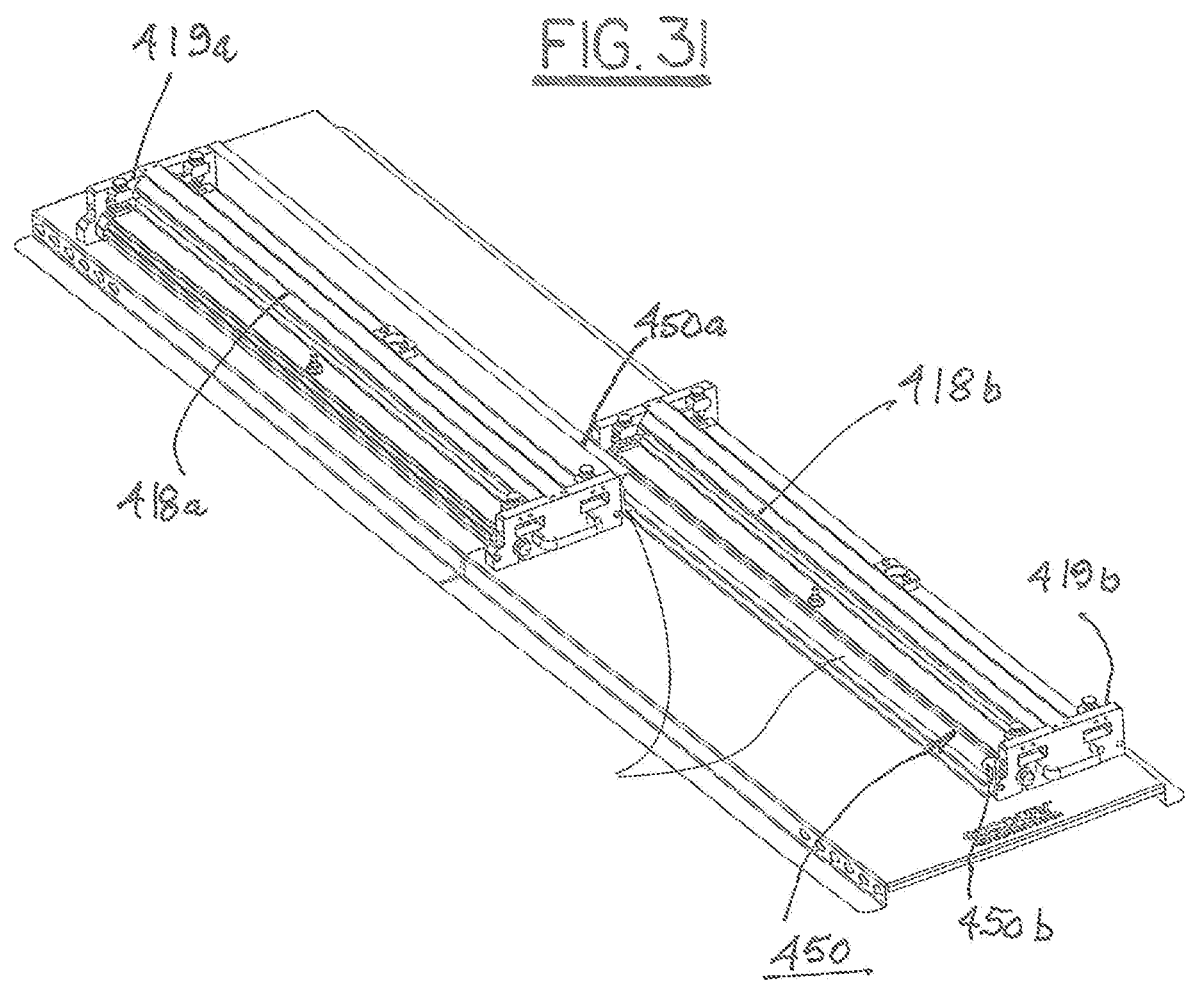

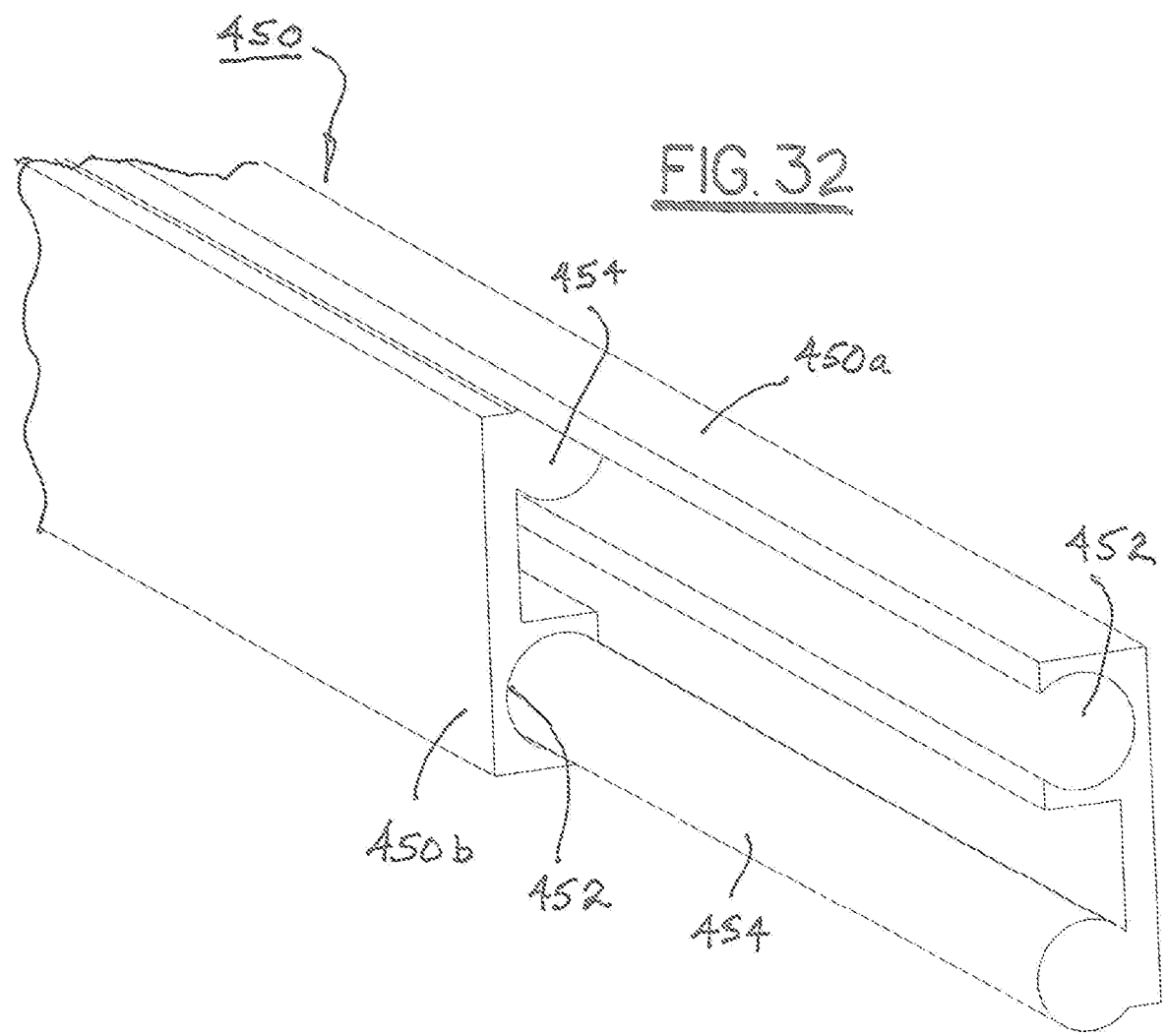

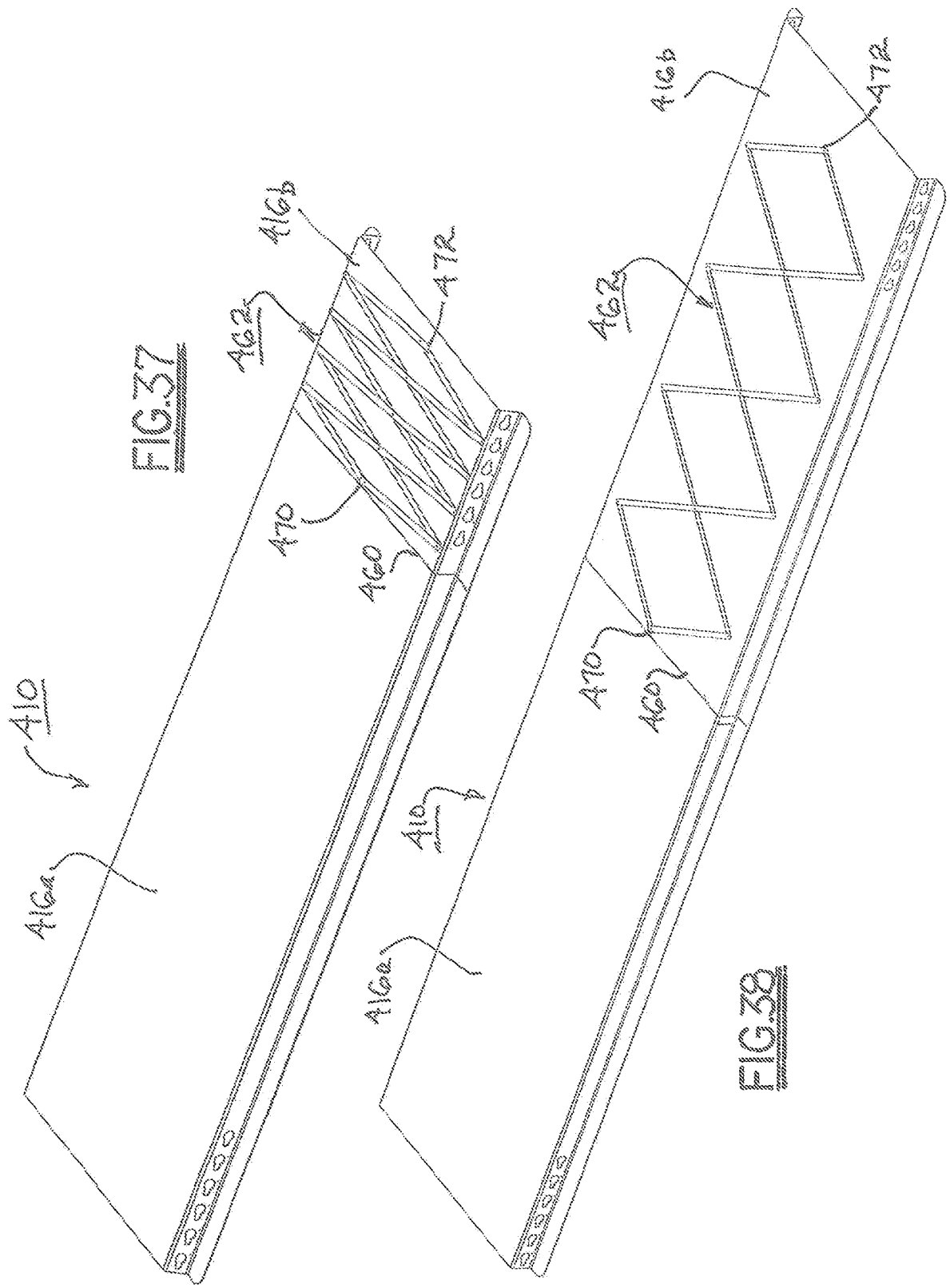

PORTABLE BRUSHLESS CONVEYOR BELT CLEANER SYSTEM

TECHNICAL FIELD

The present invention relates to systems and methods for cleaning conveyor belts; more particularly, to systems and methods for cleaning soft or fabric conveyor belts as may be used, for example, in the continuous baking arts; and most particularly to such a conveyor belt cleaner system employing steam, a plurality of wipers, and vacuum.

BACKGROUND OF THE INVENTION

The present invention is directed to the art of cleaning commercial conveyor belts.

In the prior art, conveyor belts used in various commercial activities are known to become soiled, typically with spillage from materials being conveyed or treated on the belt. It becomes desirable and necessary from time to time to clean at least the working upper surface of the belt. This is conveniently accomplished by installing a cleaning device in the path of the belt and allowing the belt to pass through the cleaning device, perhaps several times, if necessary, until the extraneous material is removed.

Conveyor belts may be divided into two categories, a) discontinuous chain-type belts formed of discrete metal or plastic elements in an articulated surface, and b) continuous belts formed of a flexible material such as plastic or fabric.

U.S. Pat. No. 7,784,476 to Handy discloses and claims a portable cleaning system for cleaning a moving item such as an escalator or conveyor belt. The system comprises an overhead steam jet assembly slidably mounted on transverse rails for motion transverse to the direction of motion of the escalator or conveyor belt. The transverse rails are disposed between width-adjustable end pieces that rest on stationary outer members of the escalator or conveyor belt.

A shortcoming of this system is that the entire width of the belt cannot be cleaned simultaneously but rather by successive passes of the steam jet assembly over the belt. A further shortcoming is that a mechanism must be provided to drive the steam jet assembly in a transverse direction.

U.S. Pat. No. 9,248,975 to Handy discloses and claims a portable cleaning system for cleaning a moving item such as an escalator or conveyor belt. The system comprises an overhead steam jet assembly slidably mounted on transverse rails for motion transverse to the direction of motion of the escalator or conveyor belt. The transverse rails are disposed between width-adjustable end pieces that rest on stationary outer members of the escalator or conveyor belt.

As in the Handy '476 patent, the entire width of the belt cannot be cleaned simultaneously but rather requires and relies upon successive passes of the steam jet assembly transversely over the belt. A further shortcoming is that a mechanism must be provided to drive the steam jet assembly in a transverse direction.

U.S. Pat. No. 10,150,623 to Handy discloses and claims a cleaning apparatus comprising a connection part permitting connection to a supply of cleaning fluid, and a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area or item to be cleaned, wherein the rotatable member is made of a plastics material, and wherein the rotatable member is driven by a gear provided on the rotatable member and the gear is drivable by a motor.

A shortcoming of this system is that the rotatable disc requires a gear transmission and electric motor, increasing the complexity of the cleaning mechanism.

The present invention is directed to a system for cleaning the working surface of continuous belts formed of a flexible material such as plastic or fabric, using application of steam, surface wipers, and vacuum. Numerous commercial systems exist in the prior art for performing this task, e.g., the KHD Brushless Belt Cleaning System; the Therma-Kleen Conveyor Belt Cleaner; the Amerivac-Houdini Belt Cleaning System; the Electrosteam-Belt Cleaning System; the Dupray Belt Cleaning System; and the Mekini Belt Cleaning System. All of these and other prior art systems function in the same basic way: by spreading steam across the upper surface of the moving belt, then wiping the belt surface and steam-softened material with at least one transverse wiper blade, and finally vacuuming residual water and debris from the belt surface.

Such systems can be successful in performing these cleaning steps on a conveyor belt of a specified width, wherein the steam is distributed at substantially the full width of the belt. However, a common problem arises when applying a system designed for a first belt width to cleaning of a belt having a second and narrower width wherein the steam application occurs on both the belt surface and on the fixed conveyor frame and belt backing elements outboard of the moving belt. Such steam overspray results in undesirable condensation and water pooling on conveyor frame surfaces outboard of the belt, which eventually requires corrective measures which may include stopping the conveyor and the cleaning process to mop up the excess water.

What is needed in the art is a conveyor belt cleaning system wherein the width of steam application may be adjusted to accommodate belts of various widths, thereby making such a system significantly more versatile than prior art belt cleaning systems.

SUMMARY OF THE INVENTION

The present invention is directed to a conveyor belt cleaner system, comprising a backing platen positioned transversely of the conveyor belt and fixedly disposed beneath a length of the conveyor belt to be cleaned and continuously supportive of the conveyor belt during passage of the conveyor belt over the backing platen during cleaning of the conveyor belt; a first chamber defining a steam chamber transversely disposed over the transverse backing platen and a first portion of the length of conveyor belt to be cleaned, wherein the first transverse chamber is provided with a transverse steam header connectable to a source of steam; a second chamber defining a vacuum chamber adjacent the first chamber and transversely disposed over the transverse backing platen and a second portion of the length of conveyor belt to be cleaned, wherein the second transverse chamber is operable under sub-atmospheric pressure and is provided with a suction outlet connectable to a source of vacuum, and wherein the first conveyor belt portion becomes the second conveyor belt portion by passage of the first portion from the first chamber into the second chamber; a first wiper disposed in the first chamber transversely of and in wiping contact with the first portion of the length of conveyor belt to be cleaned; a second wiper having a discontinuous wiping surface and defining a transverse septum between the first and second chambers; and a third wiper disposed in the second chamber transversely of and in wiping contact with the second portion of the length of conveyor belt to be cleaned; and apparatus cooperative with the steam header to vary the width of steam application from the steam header onto the conveyor belt in accordance with a width of conveyor belt presented to the conveyor belt cleaner system.

In another embodiment in accordance with the present invention, the apparatus may be affixed to a conveyor belt frame in a diagonal attitude with respect to the direction of travel of a conveyor belt.

In yet another embodiment, the system may comprise a plurality of top assemblies, e.g., two, operating in overlapping tandem.

In yet another embodiment, the system having a plurality of top assemblies may have telescoping members to permit adjusting the width of a system in accordance with the width of a conveyor belt to be cleaned.

BRIEF DESCRIPTION OF THE DRAWINGS

The present invention will now be described, by way of example, with reference to the accompanying drawings, in which:

FIG. 3 is an isometric view from above of a top assembly of a conveyor belt cleaner system in accordance with the present invention;

FIG. 4 is an isometric view from above of a longitudinal section of the entire assembly shown in FIG. 1;

FIG. 5 is an elevational view in partial cross-section of an end portion of the top and bottom assemblies shown in FIG. 1;

FIG. 6 is an isometric view in partial cross-section of an end portion of the top and bottom assemblies shown in FIG. 1;

FIG. 7 is a cross-sectional elevational view of the conveyor belt cleaner system shown in FIG. 1;

FIG. 8 is an isometric view from below of a wiper having a discontinuous blade edge in accordance with the present invention;

FIG. 14 is an elevational cross-sectional view of a top assembly showing schematic uneven vacuum flow in a top assembly without a volumetric velocity compensator;

FIG. 15 is an elevational cross-sectional view of a top assembly showing schematic uniform vacuum flow in a top assembly with a volumetric velocity compensator in accordance with the present invention;

FIG. 16 is an isometric view from above of a second embodiment in accordance with the present invention, showing a diagonal mounting of a conveyor belt cleaning system in accordance with the present invention;

FIG. 17 is an isometric view from below of the second embodiment shown in FIG. 16;

FIG. 18 is an isometric view of a third embodiment of a top assembly in accordance with the present invention;

FIG. 19 is a cross-sectional view of a third embodiment of a conveyor belt cleaning system in accordance with the present invention;

FIG. 20 is a cross-sectional view of a portion of the third embodiment shown in FIG. 19, showing a spring-loaded arrangement for mounting a new conveyor wiper blade;

FIG. 27 is an isometric view of the underside of the third embodiment backing platen, showing a second step in mounting the docking latches;

FIG. 28 is an isometric view of the underside of the third embodiment backing platen, showing a third step in mounting the docking latches;

FIG. 29 is a top plan view of a fourth embodiment of a conveyor belt cleaning system in accordance with the present invention employing two top assemblies operable in overlapping tandem;

FIG. 30 is a top plan view of a fourth embodiment of a conveyor belt cleaning system in accordance with the present invention employing two top assemblies operable in overlapping tandem;

FIG. 31 is an isometric view of a fourth embodiment of a conveyor belt cleaning system in accordance with the present invention employing two top assemblies operable in overlapping tandem;

FIG. 32 is an isometric view of a system of interlocking telescoping support rails employed to slidably join and support the tandem top assemblies shown in FIGS. 29-31;

FIG. 37 is an isometric view of a retractable spacer retracted when the conveyor cleaning system embodiment is in retracted mode as shown in FIG. 29; and FIG. 38 is an isometric view of a retractable spacer extended when the conveyor cleaning system embodiment is in extended mode as shown in FIG. 30.

DETAILED DESCRIPTION OF THE INVENTION

Figure 1:
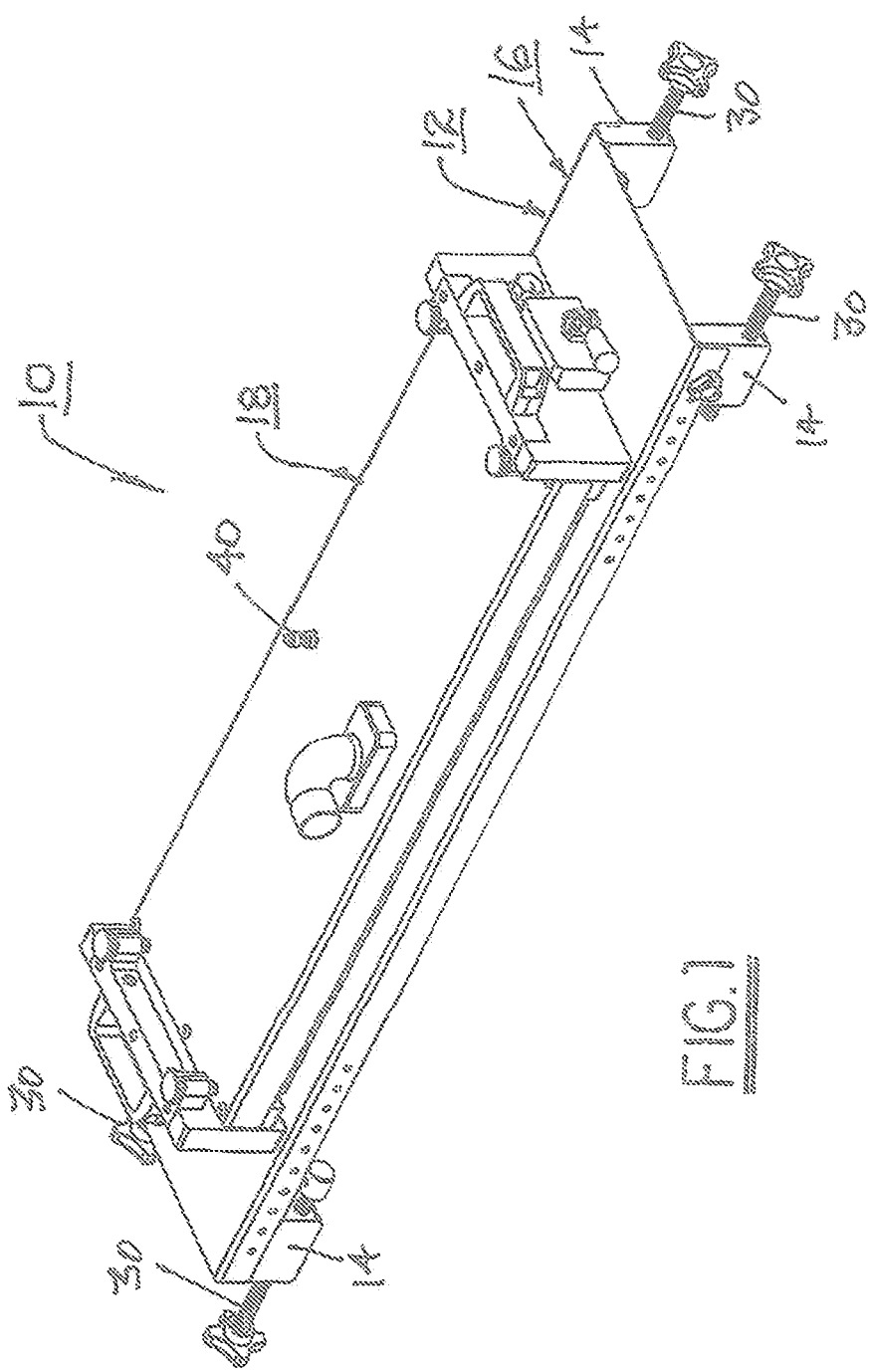
FIG. 1 is an isometric view from above of a first embodiment of a conveyor belt cleaner system in accordance with the present invention.
Figure 2:
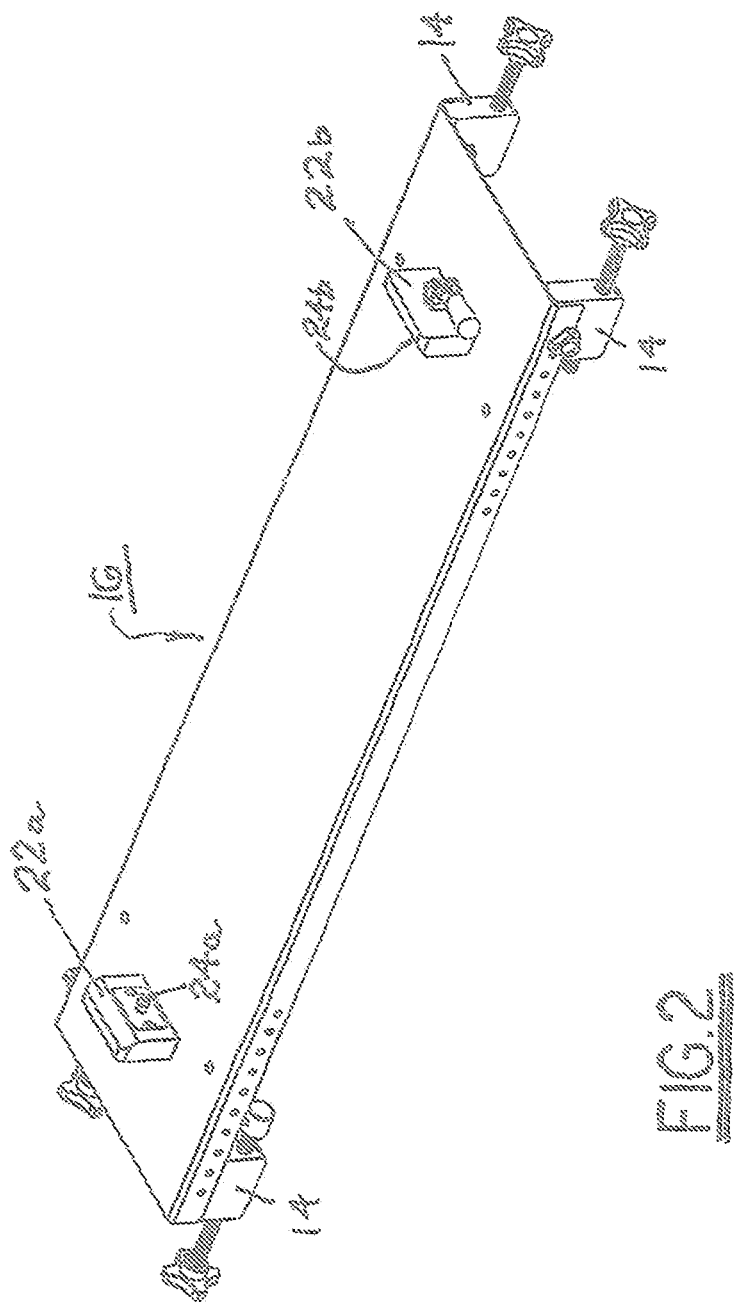
FIG. 2 is an isometric view from above of a base assembly of a conveyor belt cleaner system in accordance with the present invention.

Throughout the following description, specific elements are set forth to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Referring now to FIGS. 1 through 8, a first embodiment of a conveyor belt cleaner system 10 in accordance with the present invention comprises a base assembly 12 including a plurality of base clamps 14 supportive of a backing platen 16 and a top assembly 18. Backing platen 16 is positioned transversely of a conveyor belt 20 (FIG. 7) and disposed beneath a length of the conveyor belt to be cleaned and is continuously supportive of conveyor belt 20 during passage of the conveyor belt over backing platen 16 during cleaning of the conveyor belt.

Base clamps 14 are provided with a plurality of thumbscrews 30, preferably four disposed near the four corners of backing platen 16, for removably clamping backing platen 16 onto conveyor frame 32 (FIGS. 5 and 7), thereby securing conveyor belt cleaner system 10 transversely of the direction of travel 15 of conveyor belt 20.

Disposed on platen 16 are first and second spaced apart docking latches 22a,22b, each having a retractable pin 24a,24b and over-center latch 26a,26b, for receiving and removably engaging respective docking ends 28a,28b of top assembly 18, thereby removably attaching top assembly 18 to base assembly 12 (FIG. 5).

Top assembly 18 comprises a formed transverse structural element 19 including a first chamber 34 defining a steam chamber transversely disposed over transverse backing platen 16 and a first portion 36 of conveyor belt 20 to be cleaned. First chamber 34 is provided with a tubular transverse steam header 38 connectable via a central nipple 40 to a source of steam (not shown). Steam header 38 is provided with a plurality of nozzle openings 42 (FIGS. 9-11, nozzles 42a-42h) spaced apart at regular intervals, preferably one inch, along the bottom of the steam header. Steam header 38 is open at each end to receive a steam-width control plug 80 in each end as described hereinbelow.

A second chamber in structural element 19 defines a vacuum chamber 44 adjacent steam chamber 34 and is similarly transversely disposed over transverse backing platen 16 and a second portion 46 of conveyor belt 20 to be cleaned, wherein second transverse chamber 44 is operable under sub-atmospheric pressure and is provided with a suction outlet 48 connectable to a source of vacuum (not shown). Note that first belt portion 36 becomes second belt portion 46 by passage of the first belt portion from the first chamber into the second chamber during cleaning of conveyer belt 20.

A first transverse wiper 50 is housed in a first transverse housing 52 attached within structural element 19. First wiper 50 includes a first blade 54 in wiping contact with conveyor belt 20. First wiper 50 defines the entrance to steam chamber 34.

A second transverse wiper 56 (FIG. 8) is housed in a second transverse housing 58 attached within structural element 19. Second wiper 56 includes a second blade 60 in wiping contact with conveyor belt 20. Second wiper 56 defines the entrance to vacuum chamber 44 and has a discontinuous wiping surface 62 preferably formed by channels 64 in second blade 60; thus, blade 60 allows escape of steam and debris from first chamber 34 into second chamber 44.

A third transverse wiper 66 is housed in a third transverse housing 68 attached within structural element 19. Third wiper 66 includes a third blade 70 in wiping contact with conveyor belt 20. Third wiper 66 defines the exit for conveyor belt 20 from vacuum chamber 44. Water, steam, and debris in vacuum chamber 44 are wiped by third wiper 66 from conveyor belt 20 and sucked into suction outlet 48 for disposal, leaving cleaned conveyor belt 20 substantially dry when exiting conveyor belt cleaner system 10.

In top assembly 18, structural element 19 is floating between opposing docking ends 28a,28b. A plurality of thumbscrews 72, preferably four disposed near the four corners thereof, are rotatably disposed in mounts 74 of docking ends 28a,28b and extend vertically into threaded connection with end pieces 76 of structural element 19 for regulating the vertical position of wiper blades 54,60,70 with respect to the upper surface of conveyor belt 20. Preferably, wiper blades 54,60,70 are compressed and thereby slightly flexed, insuring good wiping contact with conveyor belt 20.

As described hereinbelow, each of bottom assembly 16 and top assembly 18 may be formed as having telescoping sections such that the overall width of system 10 may be adjusted to fit varying widths of conveyor belt frames. Such an arrangement reduces inventory by eliminating the need for multiple widths of system 10.

Referring now to FIGS. 12 through 15, uniform evacuation of steam and debris from vacuum chamber 44 depends upon uniform velocity of steam flow from all entry points across the width of the vacuum chamber to suction outlet 48. As shown in FIG. 14, areas 81 of the vacuum chamber at a distance from suction outlet 48 can experience low steam velocity, allowing debris particles to fall out of suspension. In a currently preferred embodiment, an exemplary volumetric velocity compensator 61 is disposed in vacuum chamber 44 in top assembly 18. The volumetric velocity compensator is formed to alter the effective widthwise volume of the steam chamber to maintain a widthwise flow velocity 83 of the steam sufficient to carry debris from all entry points under second wiper 60 to suction outlet 48. Addressing the full volume equalizes lift along the entire length of engagement.

A volumetric velocity compensator 61 in accordance with the present invention may be formed, preferably from a strip of metal such as stainless steel, into any suitable shape to meet the dimensions of any specific application. Exemplary velocity compensator 61 comprises a central opening 6 fitted to suction outlet 48, and crimped flanges 65 numerically or empirically shaped to squeeze steam flow from the edges toward the central opening. Preferably, compensator 61 terminates in pads 67 that may ride on a conveyor belt being cleaned in accordance with the present invention.

Figure 9:
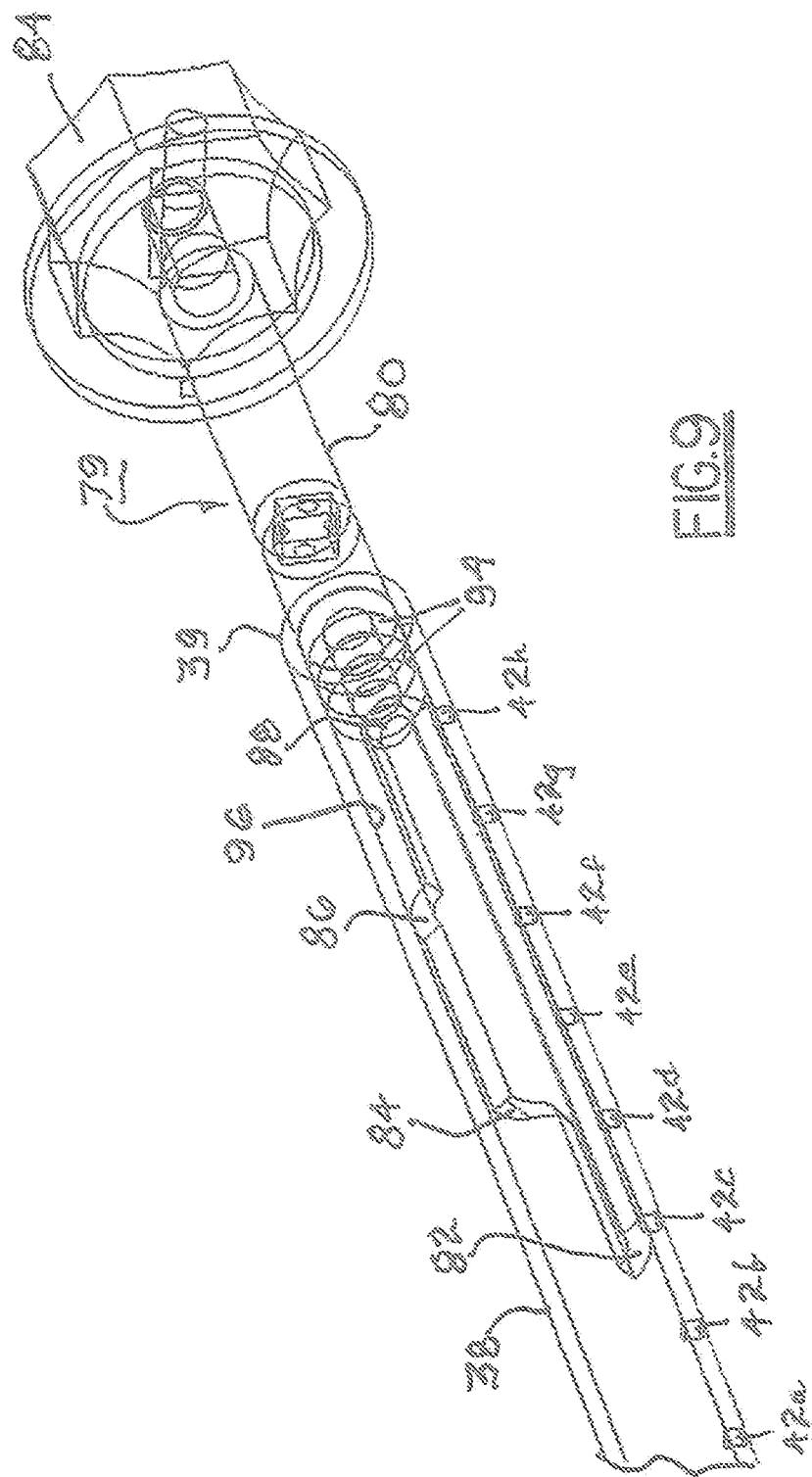
FIG. 9 is an isometric wire-line view of a steam width control apparatus in accordance with the present invention, shown in a first width-controlling position.
Figure 10:
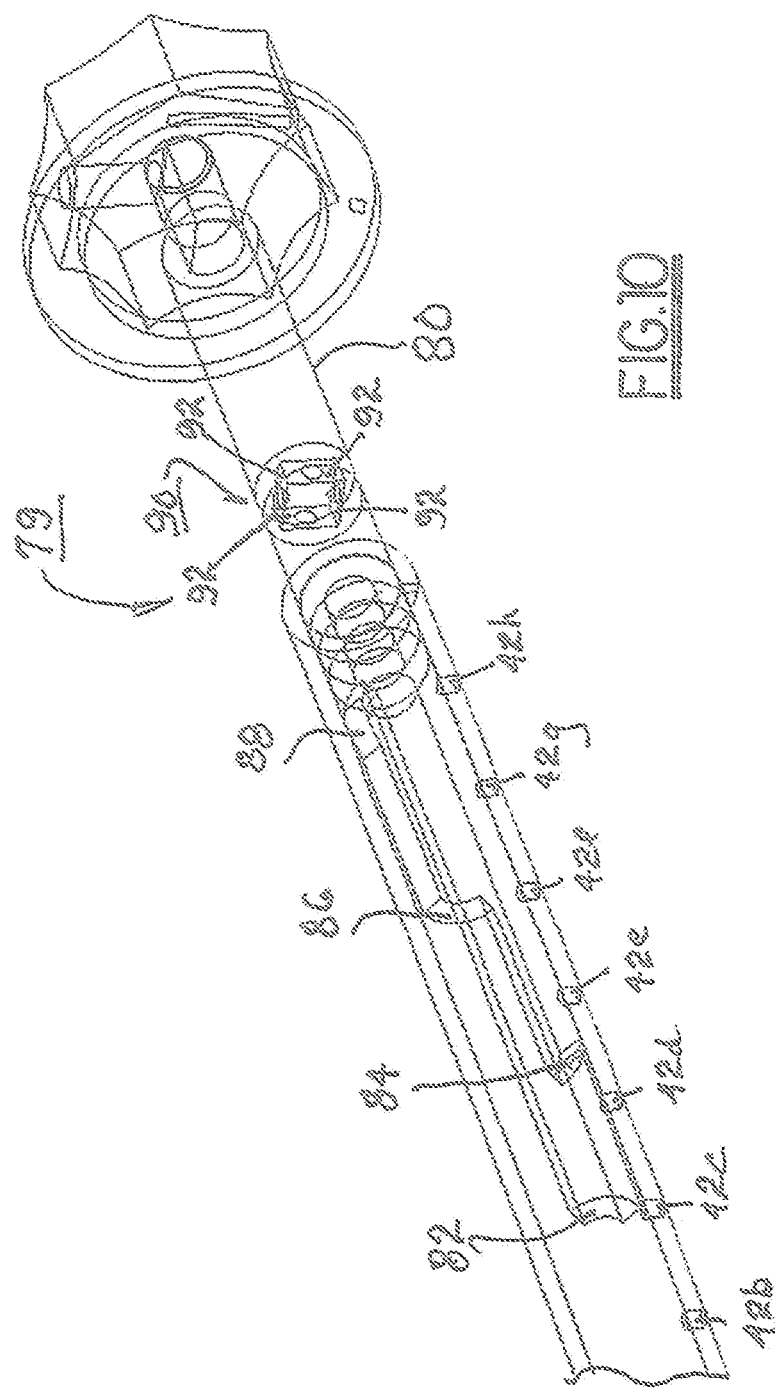
FIG. 10 is an isometric wire-line view of a steam width control apparatus in accordance with the present invention, shown in a second width-controlling position.
Figure 11:
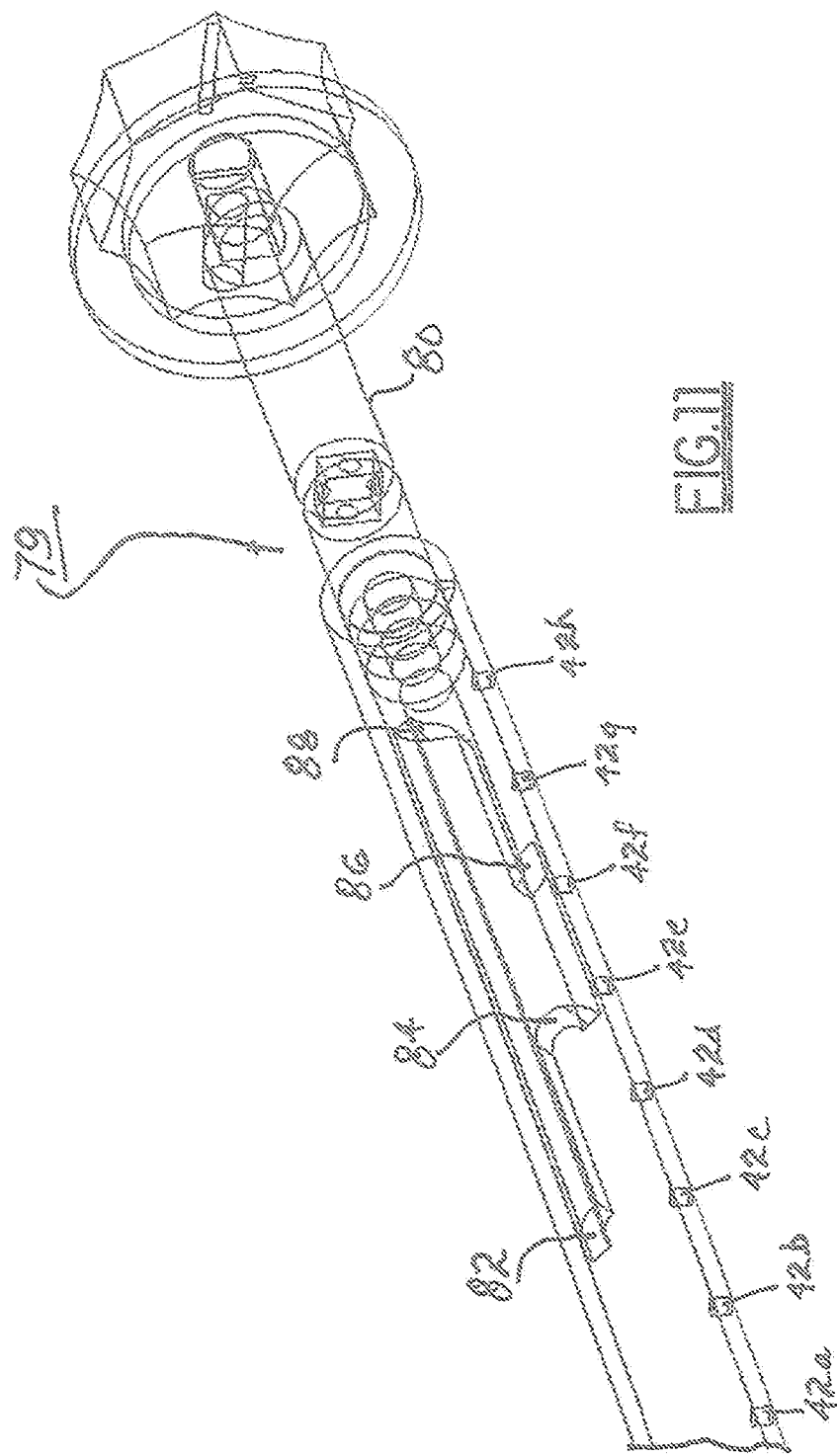
FIG. 11 is an isometric wire-line view of a steam width control apparatus in accordance with the present invention, shown in a third width-controlling position.
Figure 12:
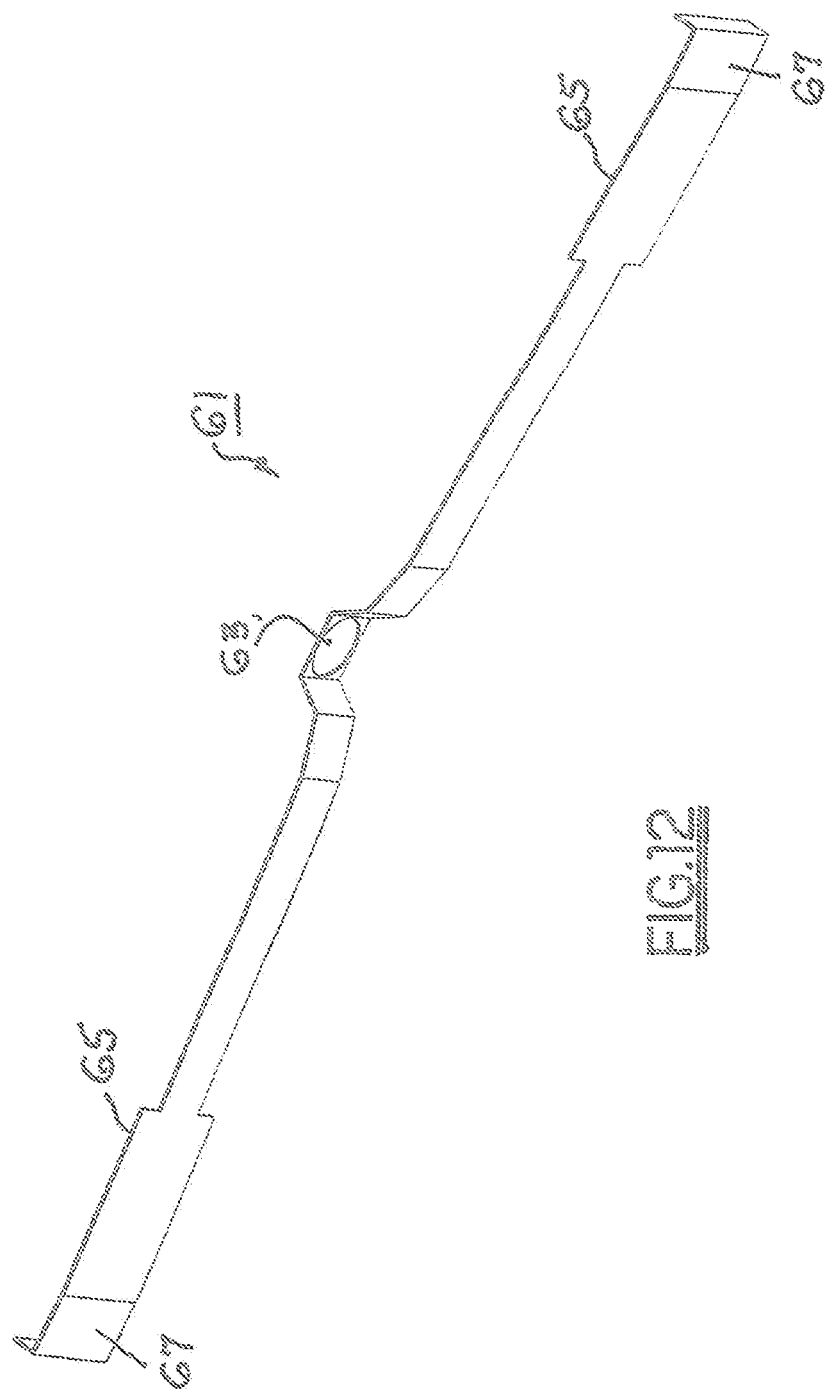
FIG. 12 is an isometric view from below of a volumetric velocity compensator in accordance with the present invention.
Figure 13:
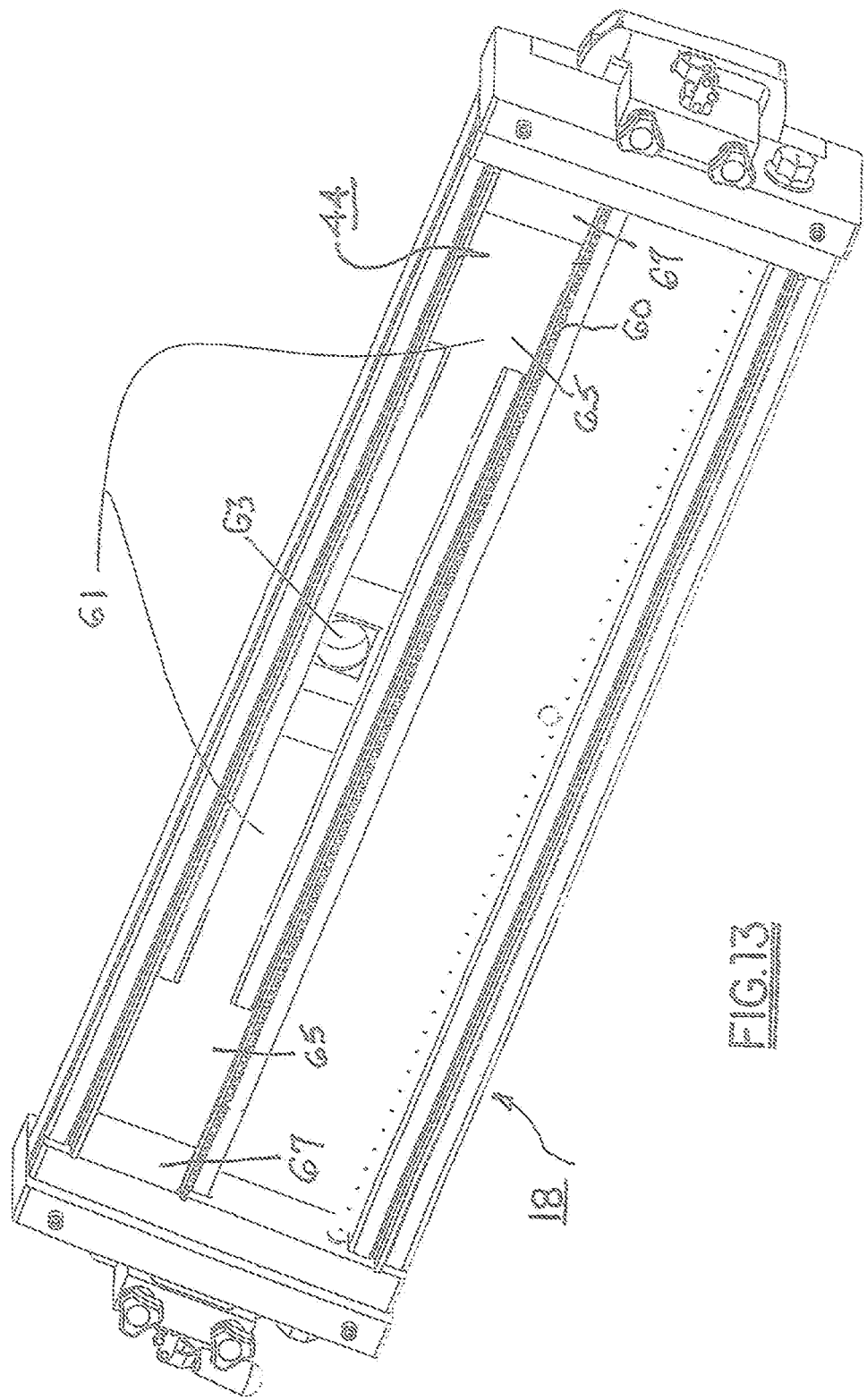
FIG. 13 is an isometric view from below of a top assembly showing a volumetric velocity compensator disposed in a vacuum chamber thereof.

Referring now to FIGS. 9 through 11, a currently preferred novel apparatus assembly 79 is shown, cooperative with steam header 38 via an open end 39 thereof to vary the width of steam application from the steam header onto the conveyor belt. As noted hereinabove, a common problem in prior art conveyor belt cleaners is that the width of steam application must accommodate the widest conveyor belt to be cleaned. When a prior art conveyor belt cleaner is presented with a narrower belt, the flow of steam onto the conveyor frame and/or backing platen outboard of the belt itself results in undesirable pooling of water along the edges of the belt. The present invention eliminates this problem.

Apparatus assembly 79 comprises a tubular steam plug 80 disposable into steam header open end 39. Steam plug 80 is formed having a plurality of steps, e.g., four steps 82,84, 86,88, in the tube wall at an open end thereof, the steps being formed at different azimuths, e.g., 90°, of the tube, and each step defining a different length of contact of steam plug 80 with the inner wall 96 of steam header 38 in the region of nozzles 42a-42h. Knob 84 is attached to the outer end of steam plug 80 such that steam plug 80 may be rotated to any desired rotational position.

It will be seen that when steam plug 80 is in a first rotational position, shown in FIG. 9, the length of steam plug 80 terminating in step 82 covers nozzles 42c through 42h, preventing steam flow from those nozzles. This steam plug setting is useful in cleaning relatively narrow conveyor belts.

When steam plug 80 is rotated 90° to a second rotational position, shown in FIG. 10, the length of steam plug 80 terminating in step 84 covers only nozzles 42e through 42h, preventing steam flow from those nozzles. This steam plug setting is useful in cleaning less narrow conveyor belts.

When steam plug 80 is rotated 90° further to a third rotational position, shown in FIG. 11, the length of steam plug 80 terminating in step 86 covers only nozzles 42g and 42h, preventing steam flow from those nozzles. This steam plug setting is useful in cleaning still broader conveyor belts.

When steam plug 80 is rotated 90° still further to a fourth rotational position, not shown, the length of steam plug 80 terminating in step 88 covers no nozzles. This steam plug setting is useful in cleaning the widest conveyor belts.

Steam plug 80 preferably is provided with a polygonal section 90 having flats 92, e.g., four flats, defining detents for receiving a spring-loaded pin (not shown) to retain steam plug 80 in a selected rotational position during cleaning of a conveyor belt having a corresponding width. Further, steam plug 80 is provided with at least one, and preferably two, circumferential grooves 94 for receiving an O-ring (not shown) to seal steam plug 80 against inner tube wall 96 to prevent steam leakage around the stepped portions of steam plug 80.

In an alternative embodiment (not shown), nozzles 42a-42h are replaced by a continuous slot in the bottom of steam header 38, and steam plug 80 is replaced by a similar plug having a continuous lengthwise bevel such that rotation of the plug causes more or less of the slot to be covered or exposed, thereby controlling the width of steam application to the conveyor belt.

Referring now to FIGS. 16 and 17, a second embodiment of a conveyor belt cleaner system 110 in accordance with the present invention is formed to be disposed in a diagonal attitude across conveyor belt 20 traveling in direction 15 over conveyor belt frame 32.

System 110 comprises a base assembly 112 including a base frame 114 supportive of a backing platen 116 and a top assembly 118. Backing platen 116 is positioned diagonally of conveyor belt 20, preferably by an angle α at least about 10° with respect to the orthogonal 117 of direction 15. Backing platen 116 is disposed beneath a length of the conveyor belt to be cleaned and is continuously supportive of conveyor belt 20 during passage of the conveyor belt over backing platen 116 during cleaning of the conveyor belt.

Base assembly 112 includes a plurality of supports 115, preferably four, pivotably mounted to the underside of backing platen 116 near the four corners thereof and secured to backing platen 116 with respective thumbscrews 119. Each support 115 is provided with a thumbscrew 130 for removably and diagonally clamping base frame 114 onto conveyor frame 32, thereby securing conveyor belt cleaner system 110 diagonally of the direction of travel 15 of conveyor belt 20.

The remainder of platen 116 is substantially identical with platen 16 in first embodiment 10, although system 110 overall may need to be somewhat longer than system 10 to accommodate the diagonal mounting attitude. Top assembly 118 is substantially identical with top assembly 18 in first embodiment 10.

Referring now to FIGS. 18 and 19, another embodiment 218 of a top assembly in accordance with the present invention comprises a longitudinal steam chamber housing 234 fixed to respective docking ends 228a,228b. A steam entry housing 236 and a vacuum housing 238 are flotably disposed between docking ends 228a,228b. An entry wiper 254 and middle wiper 260 define the bounds of steam chamber 234. An exit wiper 270 defines the exit from vacuum chamber 244. A plurality of thumbscrews 272, preferably four disposed near the respective corners of docking ends 228a,228b, are employed as in the first embodiment to regulate the height of the top assembly above a conveyor belt being cleaned.

Figure 21:
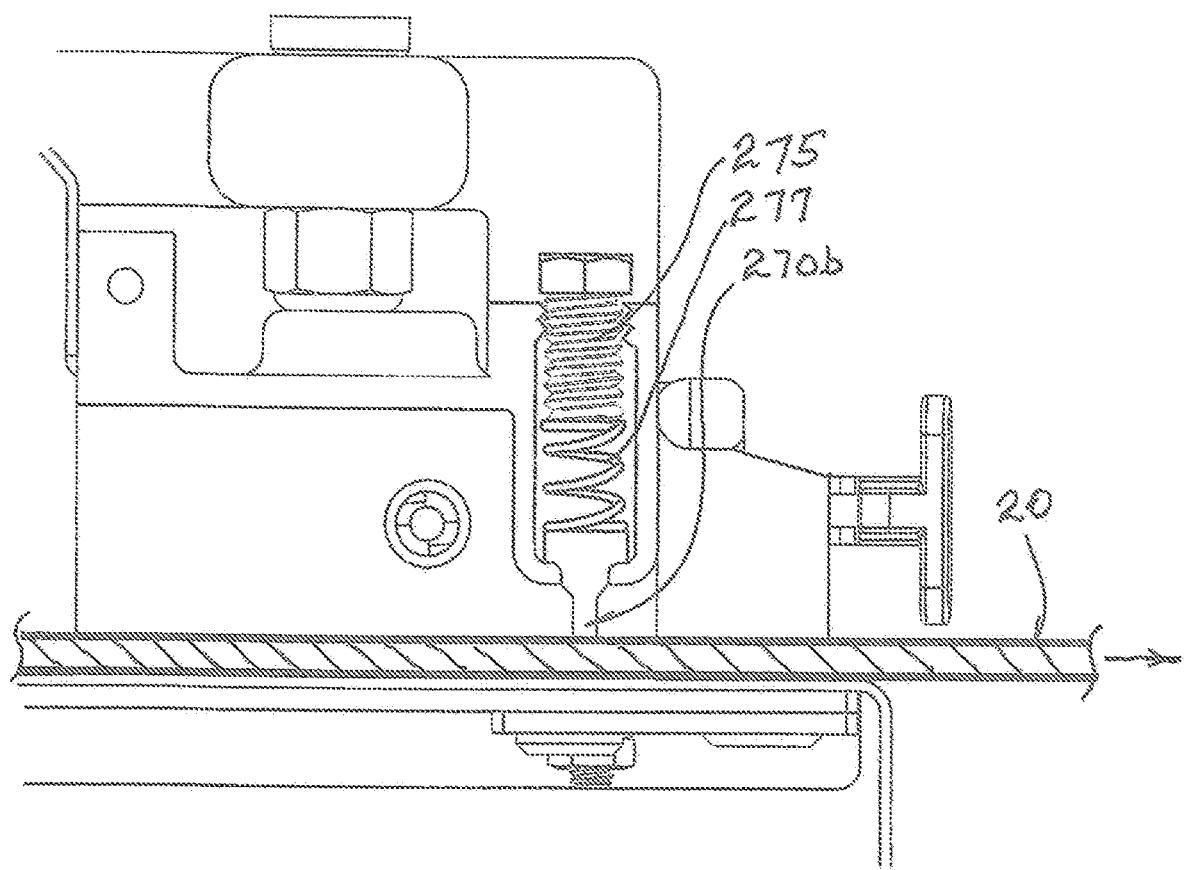
FIG. 21 is a cross-sectional view like that shown in FIG. 20, showing a partially-worn wiper blade still making contact with a conveyor belt.
Figure 22:
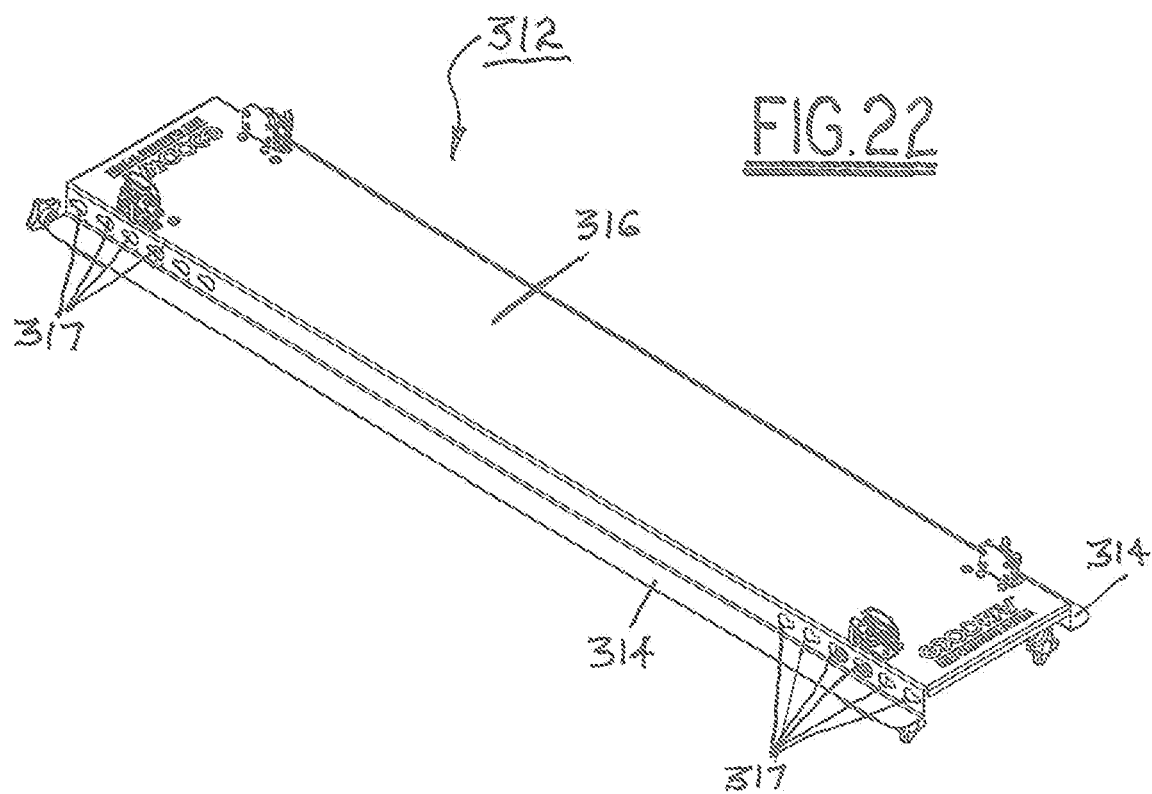
FIG. 22 is an isometric view of a third embodiment of a base assembly in accordance with the present invention.
Figure 23:
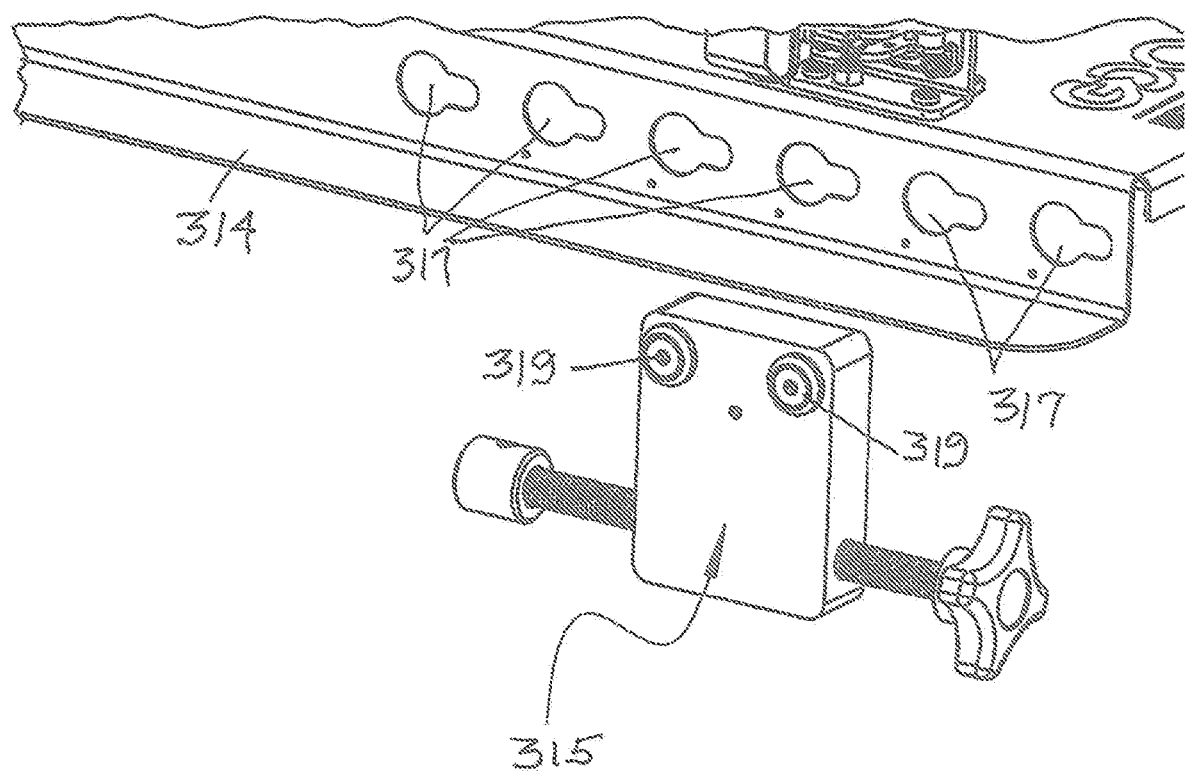
FIG. 23 is a detailed view of a portion of the base assembly shown in FIG. 22, showing a first step in assembling a clamp assembly to a second embodiment of a backing platen.

Referring now to FIGS. 20 and 21, in a currently preferred embodiment each wiper blade 254,260,270 is mounted, and protrudes from a lower slot, in a longitudinal chamber 271 having a threaded upper entry 273 near each end. Shown exemplarily in FIGS. 20 and 21 is the arrangement for exit wiper 270. A retaining screw 275 is disposed in each threaded entry 273 and engages a captive spring 277 operable against the upper surface of exit wiper 270 near each end, thereby urging wiper 70 against conveyor belt 20. A new exit wiper 270a is shown in FIG. 20. It will be seen that this arrangement is self-adjusting and maintains continuous contact of wiper 270 with conveyor belt 20 as the height of the blade of wiper 270a is reduced by wear 270b as shown in FIG. 21.

Referring now to FIGS. 22 through 25, a further embodiment 312 of a base assembly in accordance with the present invention comprises a base frame 314 and a backing platen 316. As described hereinbelow, connection of various components in the base assembly is carried out by employing bayonet lock holes 317 receivable of T-nuts 319, shown in FIG. 23 as an element of base clamp assembly 315.

Figure 24:
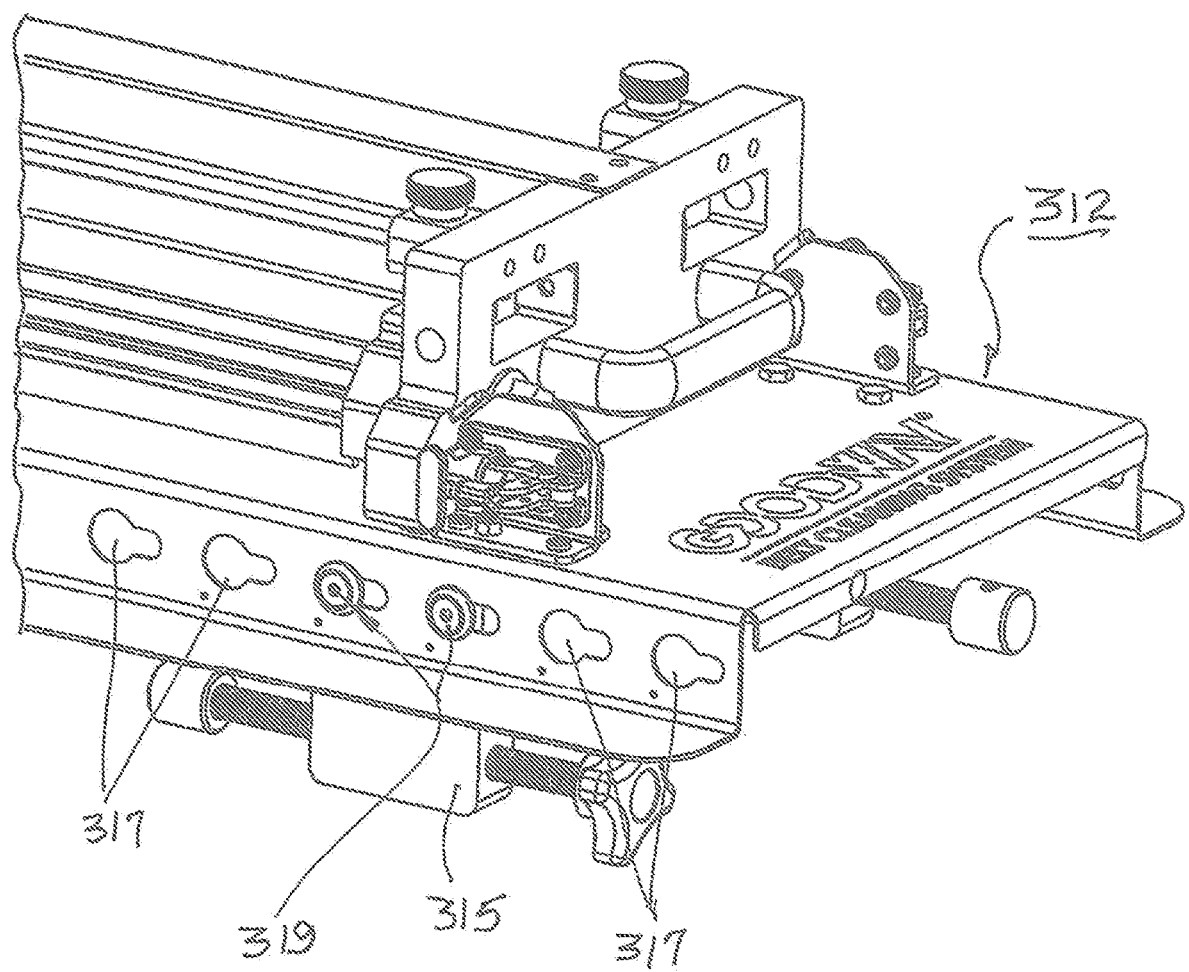
FIG. 24 shows a second step in assembling a clamp assembly to a backing platen.
Figure 25:
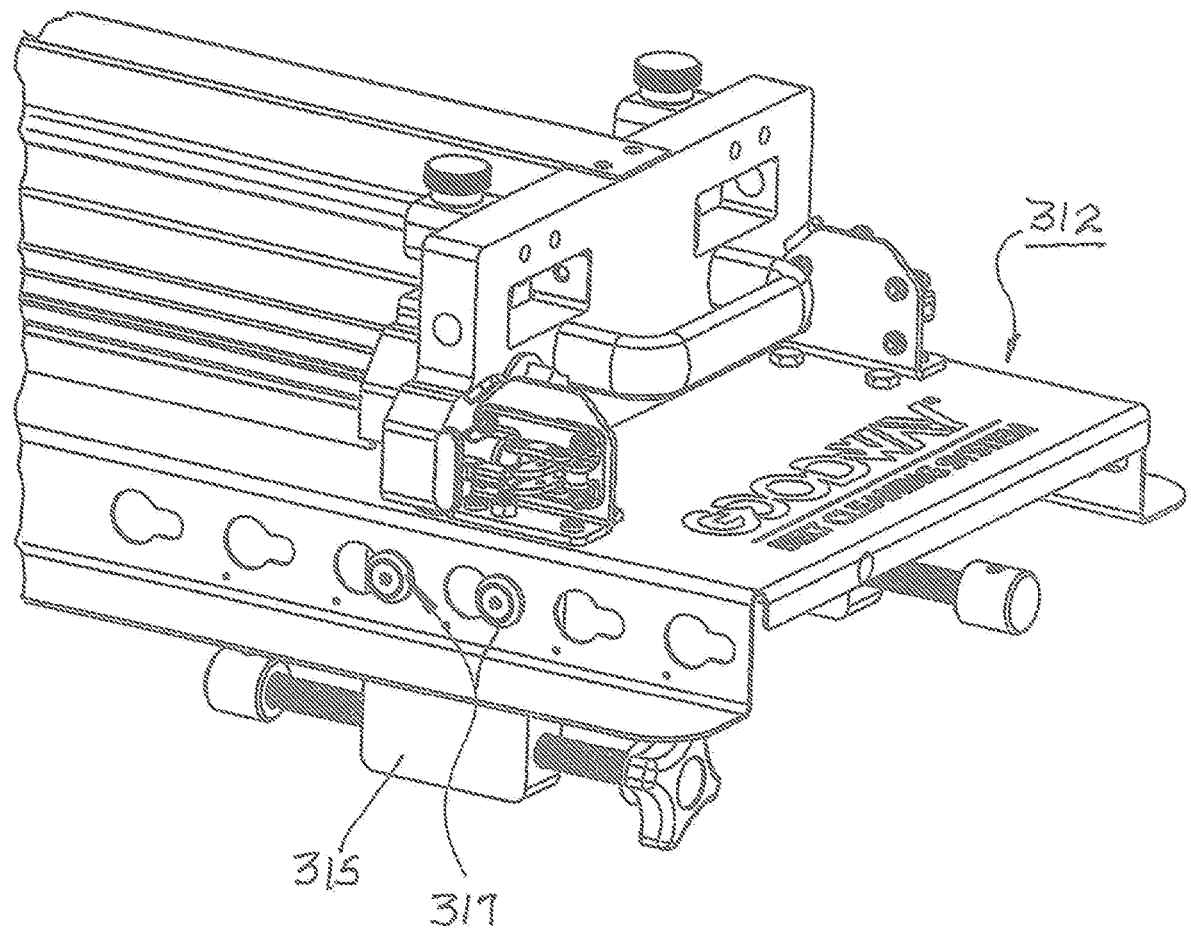
FIG. 25 shows a third step in assembling a clamp assembly to a backing platen.

To mount base clamp assembly onto base frame 314, a pair of bayonet lock holes 317 is selected commensurate with the width of a conveyor belt to be cleaned, and T-nut 319 heads thereof are inserted from the rear of lock holes 317 through the broad ends of lock holes 317 (FIG. 24). Base clamp assembly 315 is then shifted (FIG. 25), sliding T-nuts 319 into the narrow ends of lock holes 317, securing the base clamp assembly in place. It will be seen that the four base clamp assemblies may be quickly and easily repositioned to accommodate a plurality of conveyor belt widths.

Figure 26:
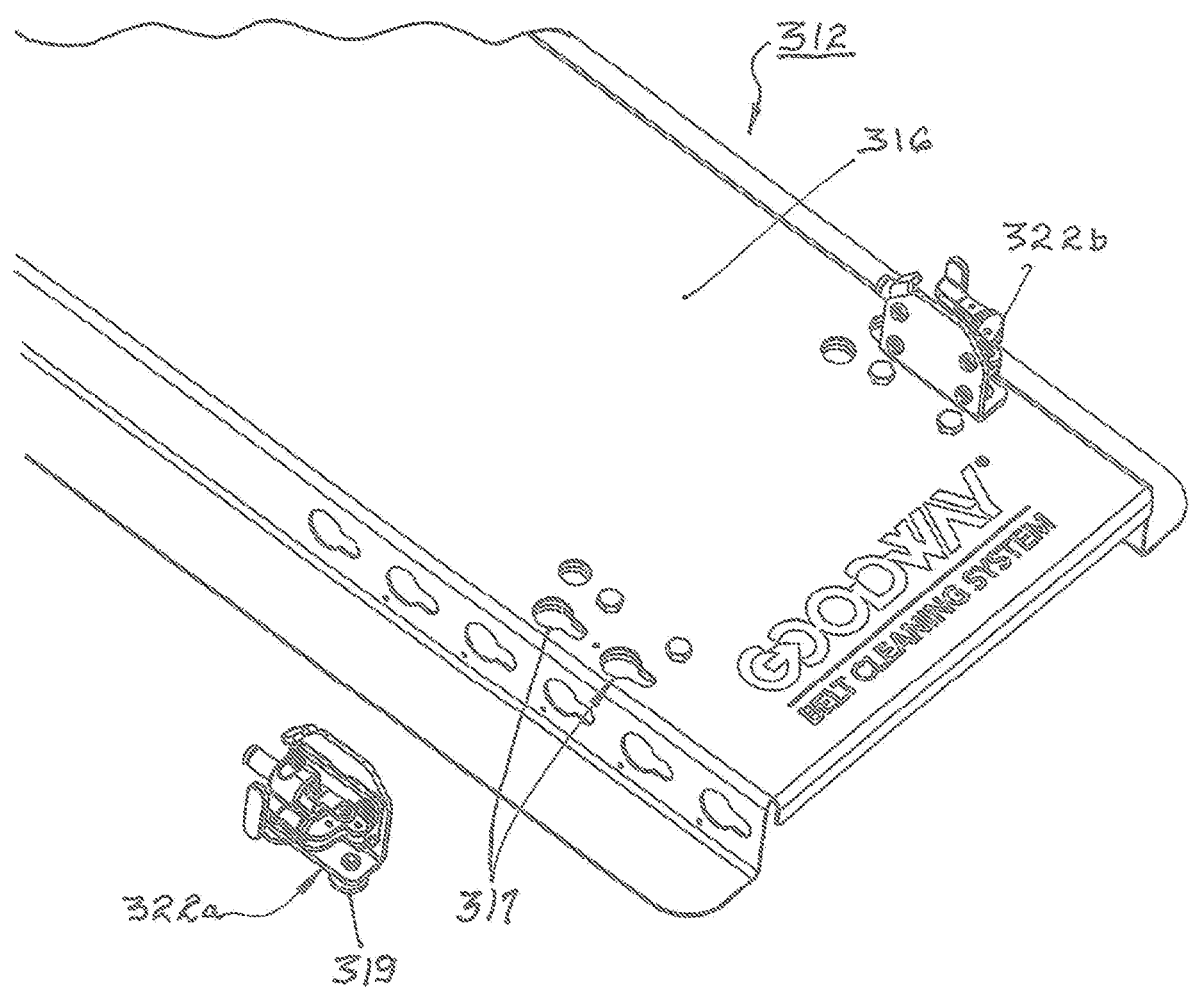
FIG. 26 shows second embodiments of first and second docking latches being mounted to the third embodiment backing platen shown in FIG. 22.

Referring to FIGS. 26, 27 and 28, backing platen 316 is likewise provided with a plurality of bayonet lock holes 317, and docking latches 322a,322b are likewise provided with T-nuts 319, whereby the docking latches may be secured to the backing platen, in the manner just described for the clamp assemblies, in a plurality of positions to accommodate a plurality of conveyor belt widths. Also, the docking latches may be easily removed and reinstalled to facilitate sliding the base assembly 312 under a conveyor belt during installation of the system into cleaning position.

A problem can arise in cleaning the outer portions of relatively wide conveyor belts with an apparatus having only a single steam chamber and single vacuum chamber. It has been found that providing two complete top assemblies, tied together and operable in tandem in overlapping fields, can provide superior cleaning of relatively wide conveyor belts.

Referring now to FIGS. 29 through 32, another embodiment 410 of a conveyor belt cleaning system in accordance with the present invention is shown. Embodiment 410 comprises a base assembly 412 that may comprise first and second partial base assemblies 412a,412b including first and second partial backing platens 416a,416b wherein one partial base assembly and one partial backing platen are retractable into the other partial base assembly and other partial backing platen, respectively, along base split line 413, secured by locking screws 415, to adjust for width of use, storage, and shipping of the overall system. A first top assembly 418a is mounted at its left end 419a onto first partial base assembly 412a and extends at its right end 419a' over the surface of second backing platen 416b. A second top assembly 418b is mounted at its right end 419b onto second partial base assembly 412b and extends at its left end 419b' over the surface of first backing platen 416a. A conveyor belt to be cleaned (not shown) is passed over first and second backing platens 416a,416b between left end 419a and right end 419b.

It should be noted that in a more general version of embodiment 410 (not shown), base assembly 412 may be formed as a single, non-retractable unit for a given width of conveyor belt, to which top assemblies 418a,418b and mounted in overlapping tandem as shown in FIGS. 30 and 31.

Referring now to FIGS. 31 and 32, top assemblies 418a, 418b are coupled together, creating an inflexible structure 450 between left end 419a and right end 419b, by interlocking support rails 450a,450b. In a presently preferred embodiment, rail elements 450a,450b are identical, with one of the rail elements being reversed to mate with the other rail element. Each rail element comprises a longitudinal partial cylindrical chamber 452 formed in parallel with a longitudinal partial cylinder rod 454 such that each partial cylinder rod 454 fits retractably into its opposing partial cylindrical chamber 452. Of course, within the scope of the present invention, the interlocking support rails could be formed as two non-identical members (not shown), one member comprising both partial cylindrical chambers and the other member comprising both partial cylinder rods, but structure 450 is the preferred embodiment because it requires only the formation of identical members.

Figure 33:
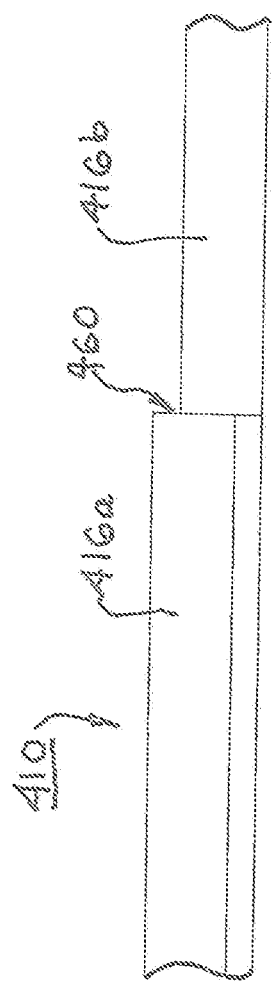
FIG. 33 is a schematic elevational view of a portion of base assembly of the fourth embodiment shown in FIG. 31, showing a step-in elevation between the left backing platen and the right backing platen.

A problem may arise in use of the system 410 shown in FIGS. 29 and 30 in that a step-in elevation will exist between left partial backing platen 416a and right partial backing platen 416b at the point of entry 460 of the right partial backing platen into the left partial backing platen, as shown in FIG. 33. This step may cause undesirable wear at the corresponding widthwise location of a conveyor belt being cleaned.

Figure 34:
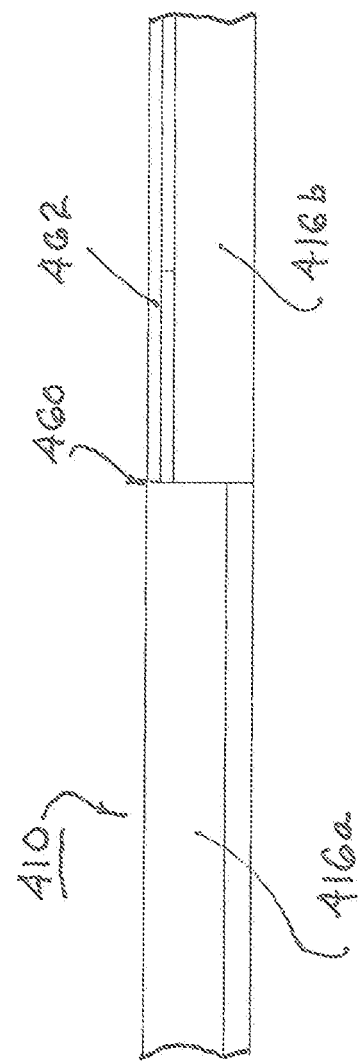
FIG. 34 is a schematic elevational view like that shown in FIG. 33, showing the addition of a retractable spacer deployed on the right backing platen to compensate for the step in elevation.
Figure 35:
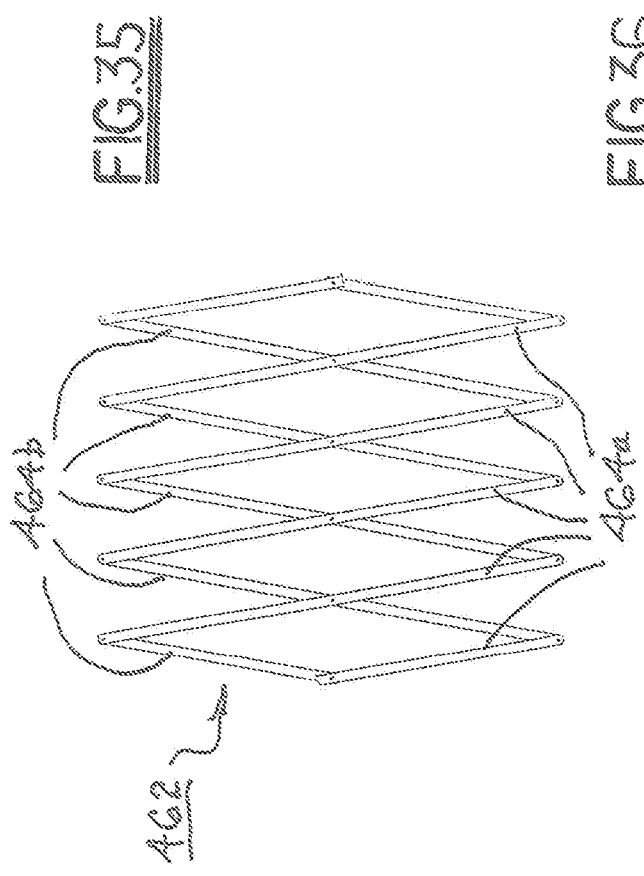
FIG. 35 is a plan view of a retractable spacer in accordance with the present invention, shown in retracted mode.
Figure 36:
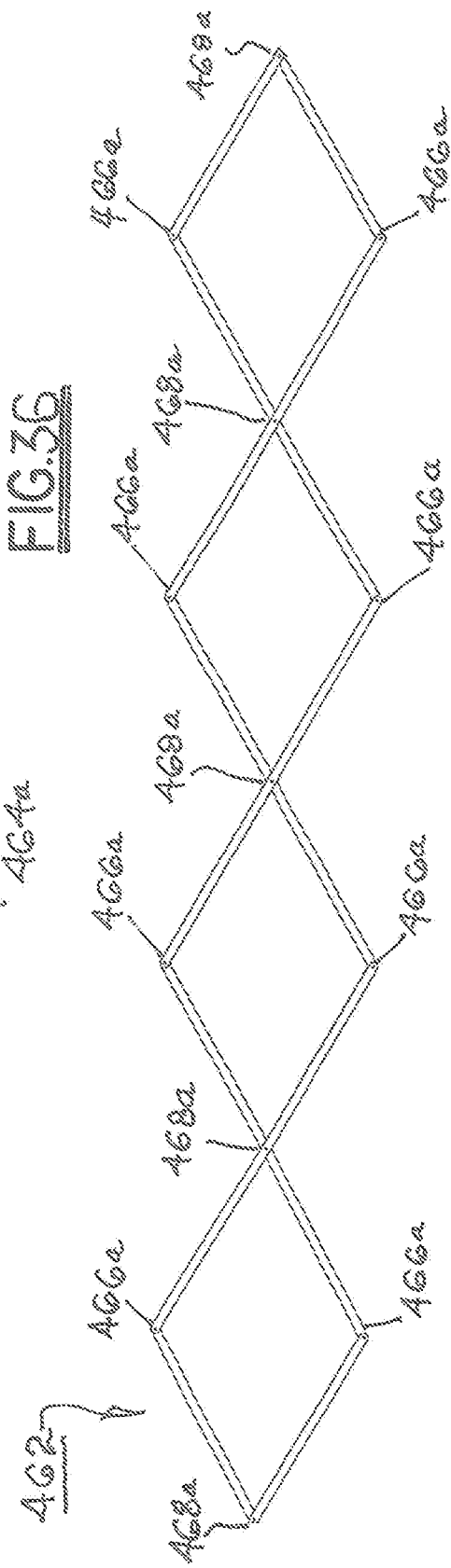
FIG. 36 is a plan view like that shown in FIG. 35, showing the retractable spacer in extended mode.

Referring now to FIGS. 33 through 38, a spacer 462 may be installed on the surface of right partial backing platen 416b, as shown in FIG. 34. FIGS. 35 and 36 show an exemplary retractable spacer 462 in accordance with the present invention, in retracted mode in FIG. 35 and in extended mode in FIG. 36. Spacer 462 comprises a plurality of cross-hatched ribs 464a, 464b pivotably attached at the intersecting ends 466a and centers 466b of the respective ribs. As shown FIGS. 37 and 38, the center intersection 468a of the left end of spacer 462 is attached to left partial backing platen 416a at point 470, and center intersection 468b of the right end of spacer 462 is attached to right partial backing platen 416b at point 472. Thus, a conveyor belt being cleaned by embodiment 410 is fully supported at the same elevation when passing over left backing platen 416a and right backing platen 416b at any desired width of cleaning.

Figure 39:
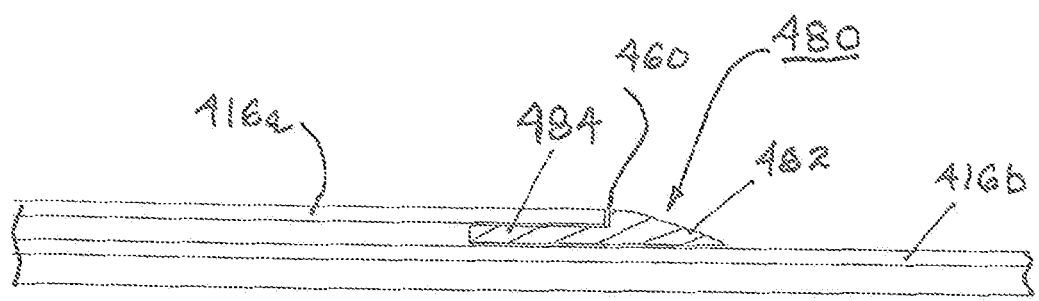
FIG. 39 is an elevational cross-sectional view of a tapered ramp that may be used as an alternative to a retractable spacer.

Referring now to FIG. 39, in some applications a simple tapered ramp 480 may be used instead of a retractable spacer 462. A tapered ramp includes a tapered portion 482 outside of point of entry 460 and a planar portion 484 insertable under left partial backing platen 416a.

While the invention has been described by reference to various specific embodiments, it should be understood that numerous changes may be made within the spirit and scope of the inventive concepts described. Accordingly, it is intended that the invention is not limited to the described embodiments but will have full scope defined by the language of the following claims.

What is claimed is:

1. A system for cleaning conveyor belts, comprising:
    a) a backing platen disposable beneath a length of said conveyor belt to be cleaned and being continuously supportive of said conveyor belt during passage of said conveyor belt over said backing platen during cleaning of said conveyor belt;
    b) a first chamber defining a steam chamber disposed over said backing platen and a first portion of said conveyor belt to be cleaned, wherein said steam chamber is provided with a steam header connectable to a source of steam and having at least one exit for steam in the underside of said steam header;
    c) a second chamber defining a vacuum chamber adjacent said first chamber and transversely disposed over said backing platen and a second portion of said length of conveyor belt to be cleaned, wherein said vacuum chamber is operable under sub-atmospheric pressure and is provided with a suction outlet connectable to a source of vacuum, and wherein said first portion of said conveyor belt becomes said second portion of said conveyor belt by passage of said first portion from said steam chamber into said vacuum chamber;
    d) a first wiper disposed in wiping contact with said first portion of said length of conveyor belt to be cleaned, said first wiper defining an entrance to said steam chamber;
    e) a second wiper defining a septum between said steam and vacuum chambers; and
    f) a third wiper disposed in wiping contact with said second portion of conveyor belt to be cleaned and defining an exit from said vacuum chamber; and
    g) apparatus including an adjustable steam application assembly that accommodates varying belt widths with said steam header to vary the width of steam application from said steam header onto said conveyor belt, said steam width application being variable in accordance with a width of conveyor belt presented to said conveyor belt cleaner system.

2. A system in accordance with claim 1 wherein said second wiper includes a discontinuous blade.

3. A system in accordance with claim 1 further comprising a base supportive of said backing platen and removably attachable by base clamps to a conveyor frame supportive of said conveyor belt.

4. A system in accordance with claim 3 wherein said system is disposable diagonally on said conveyor belt frame with respect to the direction of travel of said conveyor belt.

5. A system in accordance with claim 3 further comprising a top assembly removably attached by docking clamps to said backing platen and supportive of said first and second chambers and closing of the ends thereof.

6. A system in accordance with claim 5 wherein said top assembly includes a plurality of height adjustment mechanisms to position the top assembly at a desired height above said backing platen and said conveyor belt to provide uniform wiping of said conveyor belt by said wipers, said top assembly being installed on said base such that a moving conveyor belt encounters said steam chamber before said vacuum chamber.

7. A system in accordance with claim 5 wherein said top assembly includes a latching mechanism for removably attaching said top assembly to said base.

8. A system in accordance with claim 5 wherein said backing platen is provided with a plurality of bayonet lock holes, and at least one of said base clamps and said docking clamps is provided with a plurality of T-nuts.

9. A system in accordance with claim 5 wherein said top assembly comprises at least one mechanism including a transverse chamber for at least one of said wipers, at least one captive spring disposed in said chamber and bearing on said at least one wiper, and a mechanism for retaining said spring under compression,
wherein said chamber includes an exit slot to allow a blade of said wiper to protrude from said chamber and thereby engage said conveyor belt being cleaned.

10. A system in accordance with claim 5 further comprising a plurality of said top assemblies disposed on said backing platen, arranged in tandem in overlapping fields of cleaning.

11. A system in accordance with claim 10 wherein the number of said top assemblies is two.

12. A system in accordance with claim 11 wherein said backing platen comprises first and second partial backing platens wherein said second partial backing platen is retractable into the first partial backing platen.

13. A system in accordance with claim 12 comprising a retractable spacer disposed on the surface of said right partial backing platen and attached thereto at a right end of said retractable spacer and attached to said left partial backing platen at a left end of said retractable spacer.

14. A system in accordance with claim 13 wherein said retractable spacer comprises a plurality of cross-hatched ribs pivotably attached at intersecting ends and centers of said respective ribs.

15. A system in accordance with claim 12 comprising a tapered ramp insertable under said left partial backing platen and extending over said right partial backing platen.

16. A system in accordance with claim 11 wherein said two top assemblies disposed on said backing platen, arranged in tandem in overlapping fields of cleaning, are coupled together by interlocking support rails.

17. A system in accordance with claim 16 wherein said interlocking support rails comprise two rail elements identical in form, one of said rail elements being reversed to mate with the other of said rail elements, wherein each of said rail elements comprises a longitudinal partial cylindrical chamber formed in parallel with a longitudinal partial cylinder rod such that each partial cylinder rod fits slidably and retractably into its opposing partial cylindrical chamber.

18. A system in accordance with claim 5 wherein said top assembly includes a plurality of height adjustment mechanisms operable to position the top assembly at a desired height above said backing platen and said conveyor belt to provide uniform wiping of said conveyor belt by said wipers, said top assembly being installed on said base such that a moving conveyor belt encounters said steam chamber before said vacuum chamber.

19. A system in accordance with claim 1 wherein said apparatus cooperative with said steam header to vary the width of steam application from said steam header onto said conveyor belt comprises:
a) a plurality of nozzles formed in the underside of said steam header;
b) a tubular plug longitudinally disposed within an end of said steam header and having a plurality of steps formed at different lengths and azimuths of said plug; and
c) a control knob attached to an outer end of said tubular plug to rotate said plug to any desired rotational orientation to alternatively expose or eclipse a predetermined number of said nozzles as may be dictated by the width of said conveyor belt to be cleaned.

20. A system in accordance with claim 19 comprising an assembly of said apparatus cooperative with said steam header to vary the width of steam application from said steam header onto said conveyor belt in each end of said transverse steam header.

21. A system in accordance with claim 19 further comprising a detent mechanism for stopping said plug in a desired rotational position to establish a desired width of steam application to said conveyor belt.

22. A system in accordance with claim 1 wherein said apparatus cooperative with said steam header to vary the width of steam application from said steam header onto said conveyor belt comprises:
a) a longitudinal slot formed in the underside of said steam header;
b) a tubular plug longitudinally disposed within an end of said steam header and having a longitudinal bevel; and
c) a control knob attached to an outer end of said tubular plug to rotate said tubular plug to any desired rotational orientation to alternatively expose or eclipse a predetermined length of said slot as may be dictated by the width of said conveyor belt to be cleaned.

23. A system in accordance with claim 1 further comprising a vacuum velocity compensator disposed in said second chamber.

24. A system in accordance with claim 23 wherein said vacuum velocity compensator is provided with a central opening matable with said suction outlet and is formed such that widthwise flow velocity of steam from ends of said second chamber toward said suction outlet is sufficient to carry debris in said second chamber to said suction outlet.

25. A system for cleaning conveyor belts, comprising:
a) a backing platen disposable beneath a length of said conveyor belt to be cleaned and being continuously supportive of said conveyor belt during passage or said conveyor belt over said backing platen during cleaning of said conveyor belt;
b) a first chamber defining a steam chamber disposed over said backing platen and a first portion of said conveyor belt to be cleaned, wherein said steam chamber is provided with a steam header connectable to a source of steam and having at least one exit for steam in the underside of said steam header;

c) a second chamber defining a vacuum chamber adjacent said first chamber and transversely disposed over said backing platen and a second portion of said length of conveyor belt to be cleaned, wherein said vacuum chamber is operable under sub- atmospheric pressure and is provided with a suction outlet connectable to a source of vacuum, and wherein said first portion of said conveyor belt becomes said second portion of said conveyor belt by passage of said first portion from said steam chamber into said vacuum chamber;

d) a first wiper disposed in wiping contact with said first portion of said length of conveyor belt to be cleaned, said first wiper defining an entrance to said steam chamber;

e) a second wiper defining a septum between said steam and vacuum chambers; and f) a third wiper disposed in wiping contact with said second portion of conveyor belt to be cleaned and defining an exit from said vacuum chamber; and g) an adjustable steam application assembly operable to accommodate varying belt widths with said steam header by varying the with of steam application from said steam header onto said conveyor belt, said steam width application being variable in accordance with a width of conveyor belt presented to said conveyor belt cleaner system.

\* \* \* \* \*